United States Patent
Char et al.

(10) Patent No.: US 9,537,657 B1
(45) Date of Patent: Jan. 3, 2017

(54) MULTIPART AUTHENTICATED ENCRYPTION

(71) Applicant: Amazon Technologies, Inc., Reno, NV (US)

(72) Inventors: Hanson Char, Mercer Island, WA (US); Matthew John Campagna, Bainbridge Island, WA (US); Gregory Alan Rubin, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 111 days.

(21) Appl. No.: 14/290,699

(22) Filed: May 29, 2014

(51) Int. Cl.
 G06F 21/00 (2013.01)
 H04L 9/32 (2006.01)
(52) U.S. Cl.
 CPC .................. H04L 9/3226 (2013.01)
(58) Field of Classification Search
 CPC ............. G06F 2221/2107; G06F 12/1408; G06F 12/145; G06F 21/6218; H04L 2209/60; H04L 63/0428; H04L 9/0637; H04L 9/0668; H04N 21/23476; H04N 21/25816
 USPC ........................................................ 713/189
 See application file for complete search history.

(56) References Cited

U.S. PATENT DOCUMENTS

| | | | |
|---|---|---|---|
| 7,623,656 B2 | 11/2009 | Hawkes et al. | |
| 2005/0240762 A1 | 10/2005 | Mao | |
| 2006/0041760 A1* | 2/2006 | Huang | G06F 21/552 713/189 |
| 2008/0084996 A1 | 4/2008 | Chen et al. | |
| 2009/0204778 A1* | 8/2009 | Marking | G06F 21/16 711/163 |
| 2013/0301827 A1 | 11/2013 | Mueller et al. | |
| 2014/0101445 A1 | 4/2014 | Giladi | |

OTHER PUBLICATIONS

"Aegis: A Fast Authenticated Encryption Algorithm", Wu, et al., Selected Areas in Cryptography, 2013, pp. 1-21.
"An Introduction to Authenticated Encryption", Fitzgerald, Mar. 7, 2013, pp. 1-10.
"Using AES-CCM and AES-GCM Authenticated Encryption in the Crytographic Message Syntax (CMS)", R. Housley, Vigil Security, Nov. 2007, pp. 1-11.

(Continued)

Primary Examiner — Morshed Mehedi
Assistant Examiner — Abiy Getachew
(74) Attorney, Agent, or Firm — Robert C. Kowert; Meyertons, Hood, Kivlin, Kowert & Goetzel, P.C.

(57) ABSTRACT

Incremented authenticated encryption involves dividing a data stream to be encrypted into multiple data segments and encrypting each of the data segments. For each encrypted data segment, an authorization tag is generated. Each segment's authorization tag may be based on the corresponding segment's position in the sequence of data segments within the data stream. A segment authorization tag may be generated based on an segment initialization vector that may be incremented with each segment authorization tag. Each data segment may be encrypted independently of the others. Similarly, each encrypted data segment may be decrypted and authenticated independently of the others. Additionally, a final authentication tag may be generated. The final authentication tag may be used to authenticate all the data segments of the data stream as a whole.

21 Claims, 15 Drawing Sheets

(56) References Cited

OTHER PUBLICATIONS

"An Interface and Algorithms for Authenticated Encryption", D. McGrew, Cisco Systems, Inc., Jan. 2008, pp. 1-22.
"The Software Performance of Authenticated-Encryption Modes", Krovetz, et al., First Software Encryption, Mar. 21, 2011, pp. 1-24.

* cited by examiner

MULTIPART AUTHENTICATED ENCRYPTION

BACKGROUND

Traditional encryption and decryption techniques are often inefficient when it comes to encrypting and decrypting large amounts of data, such as large messages and/or data files. Similarly, traditional encryption techniques that attempt to combine security and authentication are often error prone and/or difficult to implement.

Furthermore, when encrypting large amounts of data it is often impossible to decrypt and/or authenticate only a portion of a larger encrypted data file without accessing the entire date file, or at least all the data up to the desired point. Additionally, traditional encryption techniques are often vulnerable to particular ciphertext attacks, such as an attack that involves analysis of attempts to decrypt a particularly chosen set of encrypted data (e.g., ciphertext).

Figure 1:
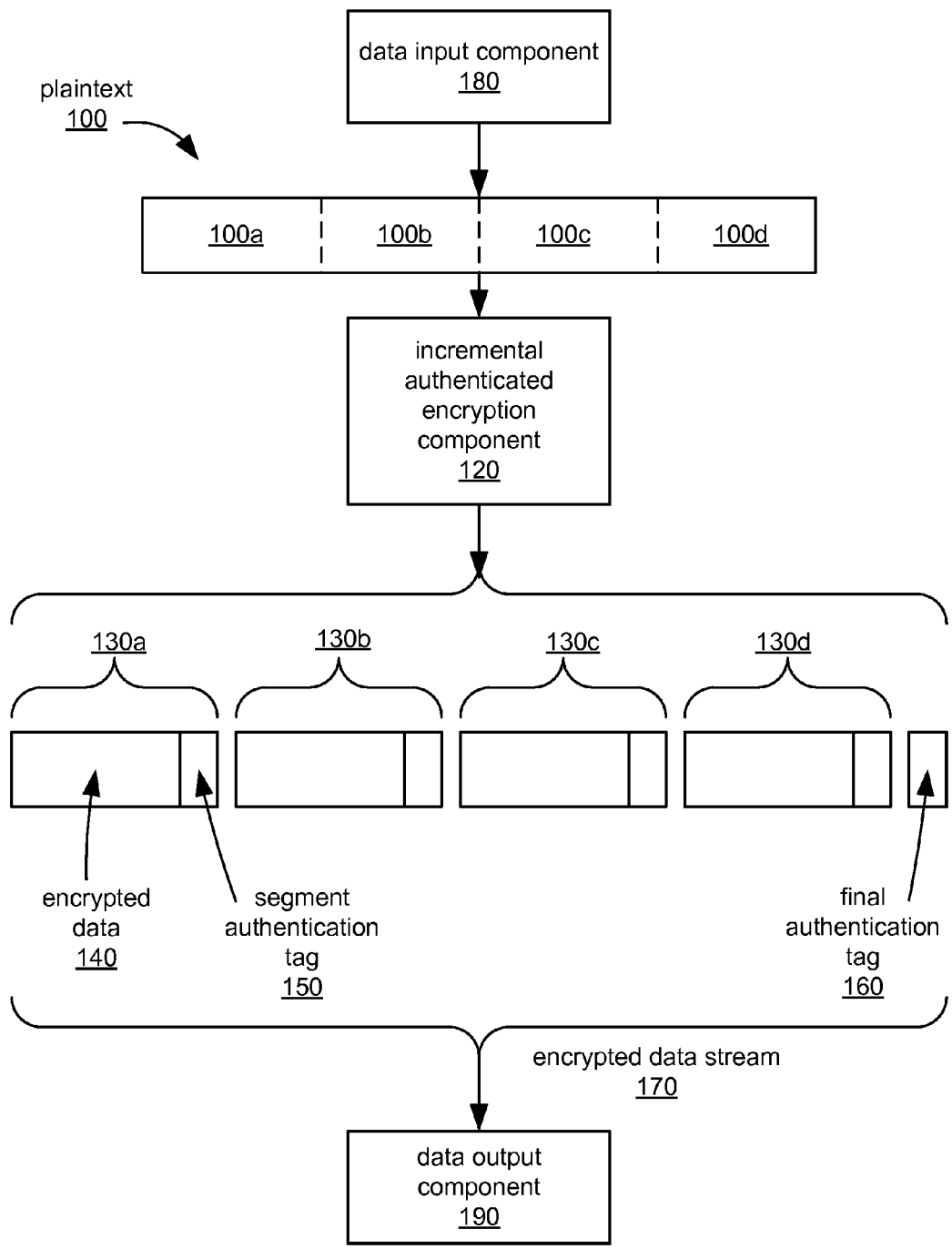
FIG. 1 is logical block diagram illustrating incremental authenticated encryption, as described herein.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing incremental authenticated encryption are disclosed. Incremented authenticated encryption involves dividing a data stream to be encrypted into multiple data segments and encrypting each of the data segments. For each encrypted data segment, an authorization tag is generated. Each segment's authorization tag may be based on the corresponding segment's position in the sequence of data segments within the data stream. A segment authorization tag may be generated based on a segment initialization vector that may be modified (e.g., incremented) with each segment authorization tag. Each data segment may be encrypted independently of the others. Similarly, each encrypted data segment may be decrypted and authenticated independently of the others.

Thus, incremental authenticated encryption may be utilized when it is desirable to read, authenticate and/or decrypt only a portion of a large, encrypted file without having to read and use more of the file than is necessary. Thus, a single data segment of multiple data segments may be read and decrypted without having to use the remainder of the multiple data segments, according to some embodiments.

Additionally, a final authentication tag may be generated. The final authentication tag may be used to authenticate all the data segments of the data stream as a whole.

When large amounts of data are to be encrypted, such as when large messages are transmitted, the data may be divided into multiple parts or segments. These data segments may then be encrypted, such as by using incremental authenticated encryption. When using incremental authenticated encryption for transmitting large messages, data segments may be encrypted during the preparation (e.g., during the generation or buffering of the individual message segments) of the messages for transmission.

When utilizing incremental authenticated encryption, a stream of data, such as a file, message, or other data, may be divided into multiple data segments. Each segment may then be encrypted and an authentication tag may be generated for the respective segment. Each segment authentication tag may be usable to verity the authenticity of the corresponding data segment. For example, a segment authentication tag may be used to ensure that none of the data of the encrypted data segment has changed since it was encrypted, according to some embodiments.

Additionally, in some embodiments, a final authentication tag may be generated, such that the entire encrypted data stream may be authenticated in some manner, such as to verify that the individual encrypted data segments have not been rearranged, as one example.

In addition to protecting message integrity and confidentiality, in some embodiments incremented authenticated encryption may provide security against various forms of chosen ciphertext attack. For example, a choses ciphertext attack may involve the analysis of an attempt to decrypt a set of particularly chosen encrypted data by inserted the chosen ciphertext into a previously encrypted set of data. In some embodiments, incremental authenticated encryption may recognize such an attack by attempting to authenticate the encrypted data prior to decryption. If the data cannot be properly authenticated, a system implementing incremented authenticated encryption may refuse to decrypt it, thereby preventing analysis of such a decryption attempt.

FIG. 1 is logical block diagram illustrating incremental authenticated encryption, as described herein. As shown in FIG. 1, a data stream, such as plaintext 100 received by data input component 180 in some embodiments, may be encrypted using incremental authenticated encryption, resulting in encrypted data stream 170. As noted above, plaintext 100 may be divided into multiple segments, such as segments 100a, 100b, 100c and 100d, each of which may be encrypted by incremental authentication encryption component 120 into encrypted data stream 170. Encrypted data stream 170 may then be output via data output component 190, in some embodiments.

Data input component 180 may be configured to receive data to be encrypted from any of a variety of sources, according to different embodiments. For example, in one embodiment, data input component 180 may be configured to read data from a file, stored either locally or remotely (e.g., such as from an online data store). In another data input component 180 may be configured to receive data over a network connection, such as by receiving one or more network messages including data to be encrypted. Similarly, data output component 190 may be configured to output the encrypted data in any of a variety of manners, according to different various embodiments. For example, in one embodiment, data output component 190 may be configured to store encrypted data to a file, stored either locally or remotely (e.g., such as to an online data store). In another embodiment, data output component 190 may be configured to output encrypted data over a network connection, such as by sending one or more network messages including encrypted data.

As shown in FIG. 1, encrypted data stream 170 may include multiple encrypted data segments 130a, 130b, 130c and 130d, each of which may include two parts. Each encrypted data segment may include encrypted data 140 and segment authentication tag 150. Additionally, in some embodiments, encrypted data stream 170 may include a final authentication tag 160.

While described herein in terms of Galois Counter Mode encryption and authentication, different embodiments may utilize different encryption and/or authentication methodologies. In general, virtually any encryption schema may be used in conjunction with incremental authenticated encryption, according to various embodiments. Similarly, virtually any authentication method (e.g., message authentication code (MAC), checksums, etc.) may be used as part of incremental authenticated encryption, as described herein.

Figure 2:
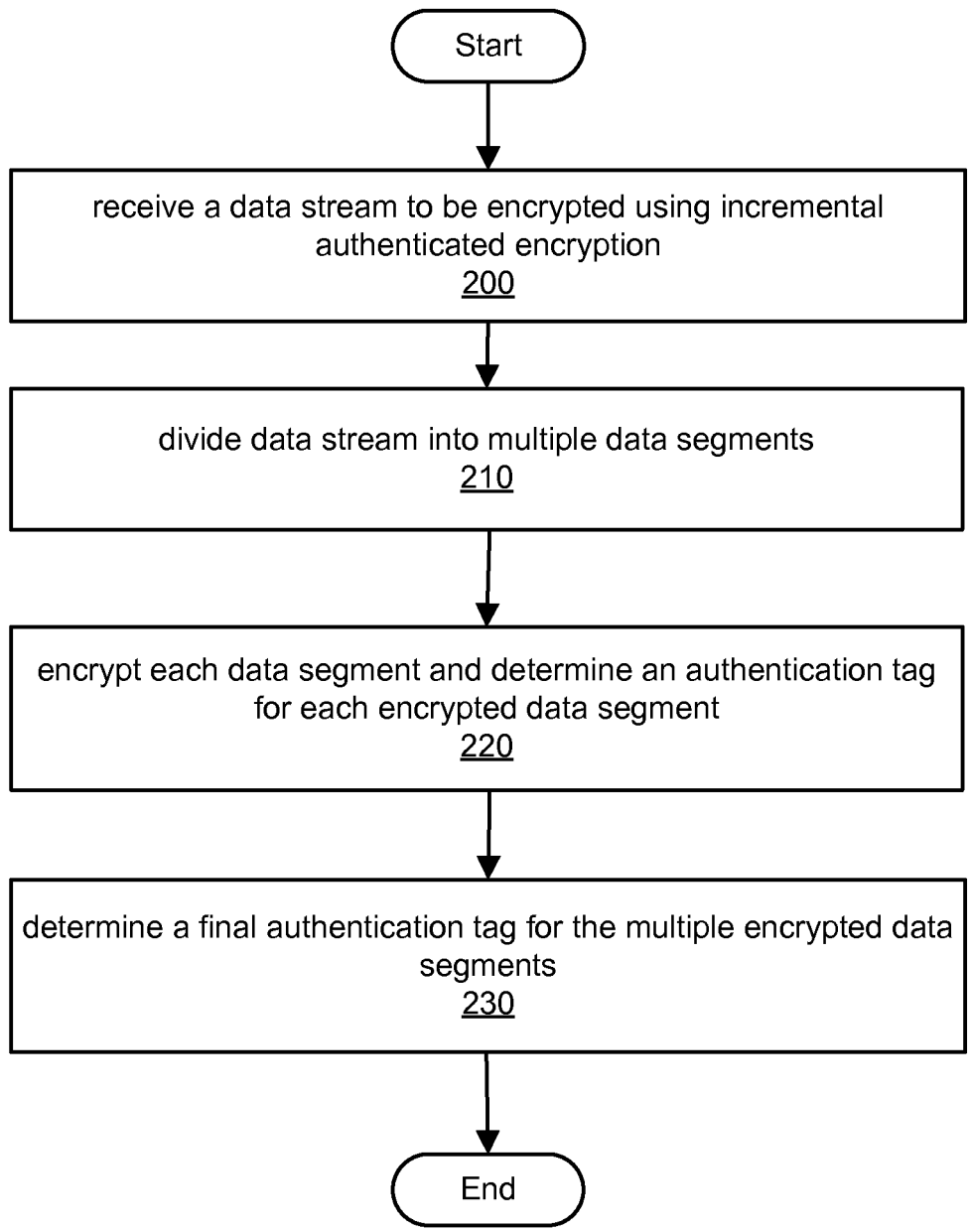
FIG. 2 is a flowchart illustrating one embodiment of method for encryption according to incremental authenticated encryption, as described herein.

FIG. 2 is a flowchart illustrating one embodiment of method for encryption according to incremental authenticated encryption, as described herein. As shown in block 200, a method for incremental authenticated encryption may include receiving a data stream to be encrypted using incremental authenticated encryption, which may be divided into multiple data segments, as shown in block 210. For example, incremental authentication encryption component 120 may be configured to receive a data stream, such as plaintext 100 and divide it, at least logically, into multiple data segments, such as segments 100a-100d. While described herein in terms of dividing a data stream, in some embodiments, the divisions may be merely logical divisions and may not represent actual, physical, separation of the data segments from each other.

Incremental authentication encryption component 120 may then encrypt each data segment and determine an authentication tag for each encrypted data segment, as shown in block 220. For instance, segment 100a of plaintext 100 may be encrypted to generate the encrypted data 140 of encrypted segment 130a and segment authentication tag 150 may be generated for segment 130a, as will be described in more detail below.

Additionally, incremental authentication encryption component 120 may determine a final authentication tag for the multiple encrypted data segments, as shown in block 230. For example, final authentication tag 160 may be generated for the data segments 130a, 130b, 130c and 130d. In some embodiments, the final authentication tag may be generated based on all the individual segment authentication tags for the multiple data segments of the data stream. In other embodiments, a separate file (or final) authentication tag may not be generated. For example, in some embodiments, the authentication tag of the final data segment may also serve as a final authentication tag, such as by taking into account (or including) the total data length as part of associated data used during generation of the tag authentication for the final data segment. In yet other embodiments, a final authentication tag may also serve as the segment authentication tag for the last data segment.

Thus, as described above regarding FIG. 1 and FIG. 2, incremental authenticated encryption may involve dividing a stream of plaintext into multiple data segments, encrypting each of those data segments, generating an authentication tag for each of segment and creating a final authentication tag. Incremental authentication encryption may allow individual segments of the data stream to be encrypted and decrypted and authenticated independently of each other, according to some embodiments. For instance, the authentication tag of each segment may be used to authenticate that data segment. Furthermore, in some embodiments, the entire data stream may be authenticated, using the final authentication tag.

For instance, when communicating a large message, such as over a network, the message may be divided into multiple message parts and each part may be encrypted independently. Additionally, each message part's authentication tag may also be generated independently (e.g., of any other message part's authentication tag). Each encrypted data segment, including its authentication tag, may then be communicated. Upon receipt any particular encrypted data segment may be decrypted and authenticated independently of the other data segments. After transmission of all the data segments, the entire message may be authenticated using the final authentication tag, which in some embodiments, may be generated based on the multiple segment authentication tags.

Figure 3:
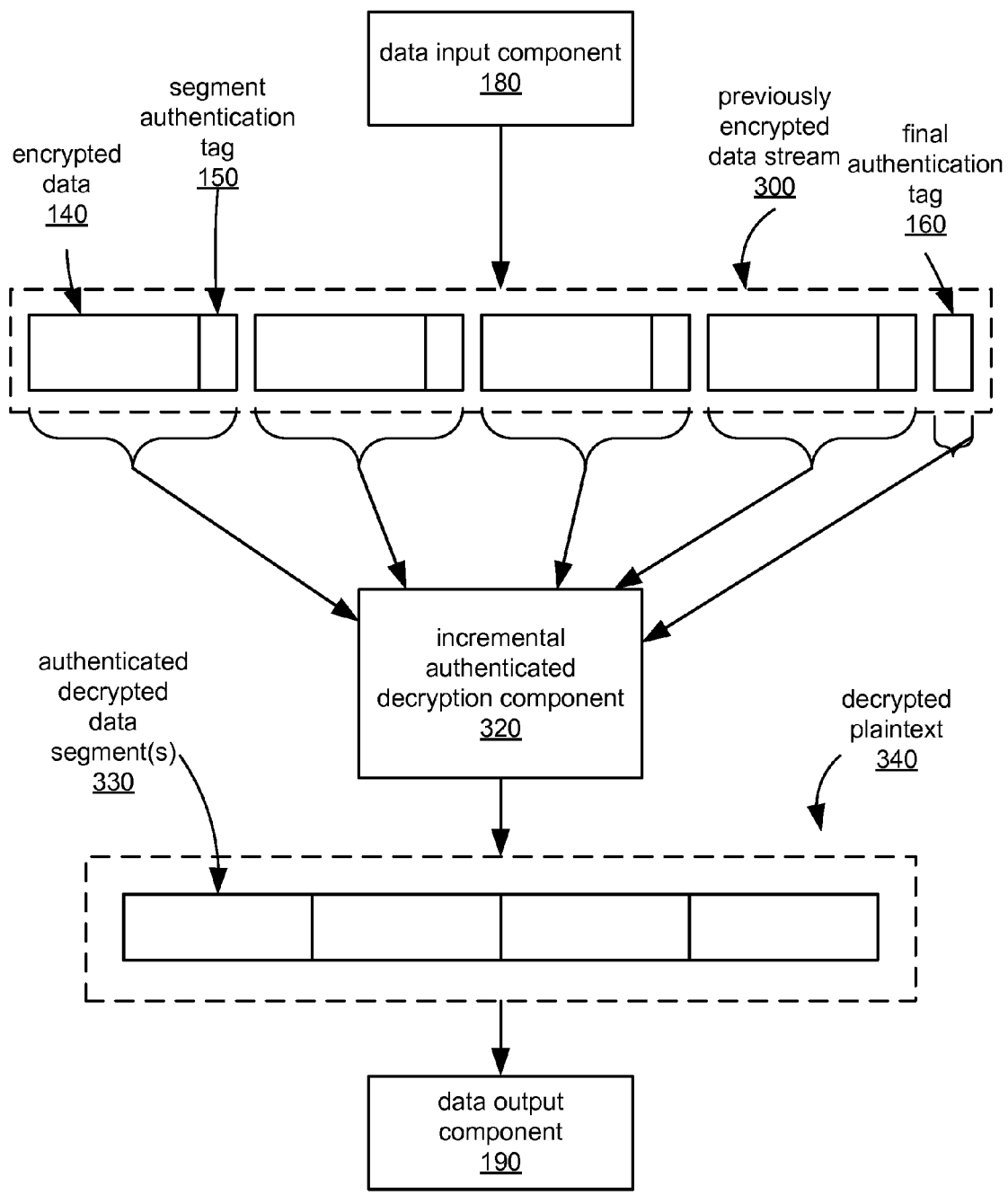
FIG. 3 is logical block diagram illustrating decryption according to incremental authenticated encryption, as described herein.

For example, FIG. 3 is logical block diagram illustrating decryption according to incremental authenticated encryption. As shown in FIG. 3, incremental authentication decryption component 320 may be configured to decrypt and authenticate previously encrypted data stream 300 that may have been received via data input component 180, in some embodiments. Encrypted data stream 300 may include multiple data segments, each of which may include encrypted data 140 and a segment authentication tag 150. Additionally, the previously encrypted data stream 300 may include a final authentication tag 160, such as may be usable to authenticate the multiple data segments as a whole.

Data input component 180 may be configured to receive encrypted data to be decrypted from any of a variety of sources, according to different embodiments. For example, in one embodiment, data input component 180 may be configured to read encrypted data from a file, stored either locally or remotely (e.g., such as from an online data store). In another data input component 180 may be configured to receive encrypted data over a network connection, such as by receiving one or more network messages including data to be encrypted. Similarly, data output component 190 may be configured to output the decrypted data in any of a variety of manners, according to different various embodiments. For example, in one embodiment, data output component 190 may be configured to store decrypted data to a file, stored either locally or remotely (e.g., such as to an online data store). In another embodiment, data output component 190 may be configured to output decrypted data over a network connection, such as by sending one or more network messages including decrypted data.

Incremental authentication decryption component 320 may be configured to decrypt a data segment and then authenticate that data segment using the corresponding segment authentication tag to generate an authenticated, decrypted data segment 330. Incremental authentication decryption component 320 may decrypt all the data segments, building the full decrypted plaintext. Additionally, the final authentication tag may be used to authenticate the decryption of the full data stream, represented by authenticated, decrypted plaintext 340. Decrypted data, such as one or more authenticated decrypted data segments 330 or decrypted plaintext 240 may be output via data output component 190.

In some embodiments, incremental authenticated decryption component 320 and incremental authenticated encryption component 120, described above, may represent the same, or different parts of the same, module or component.

Figure 4:
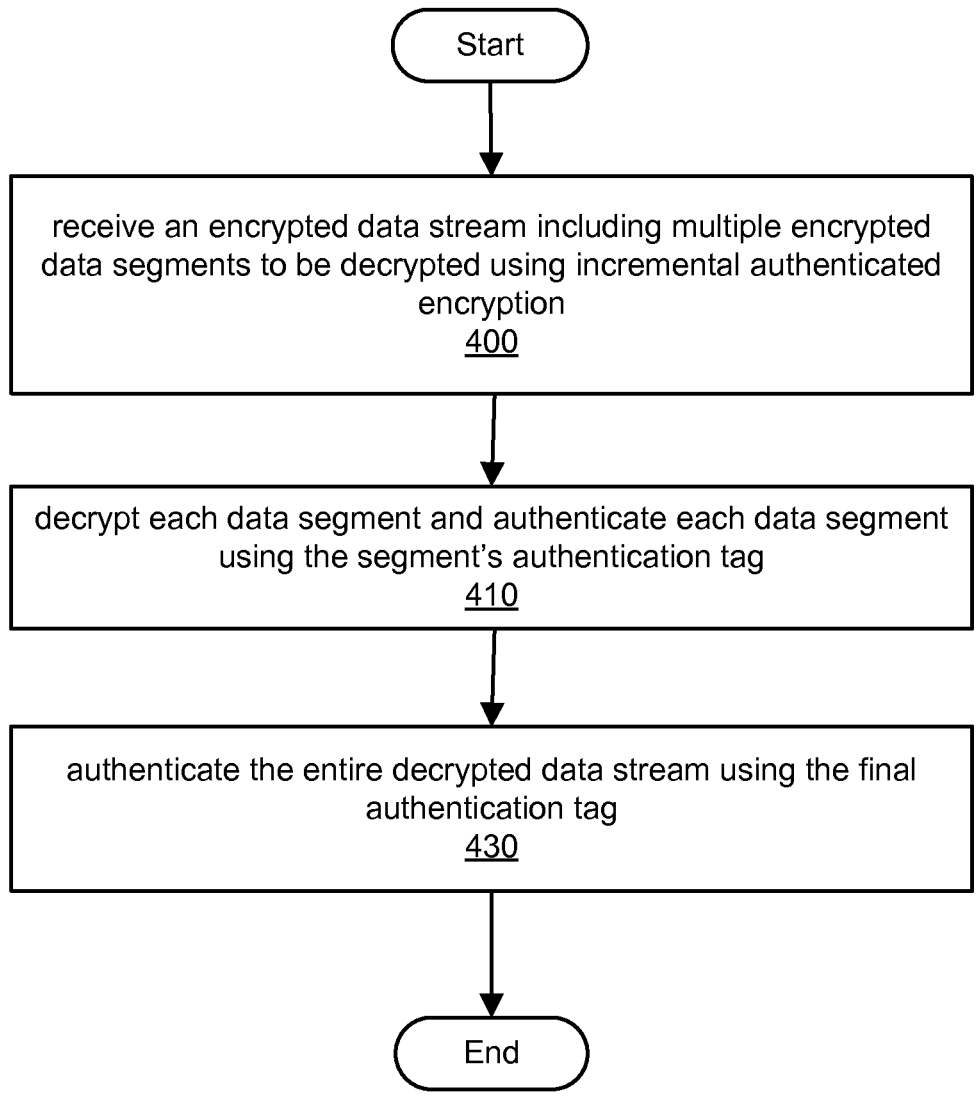
FIG. 4 is a flowchart illustrating one embodiment of method for decryption according to incremental authenticated encryption, as described herein.

FIG. 4 is a flowchart illustrating one embodiment of method for decryption according to incremental authenticated encryption, as described herein. As shown in block 400, a method for decryption according to incremental authenticated encryption may include receiving an encrypted data stream including multiple encrypted data segments to be decrypted. For example, incremental authentication decryption component 320 may receive a series of message parts, each one representing one encrypted data segment of a larger encrypted data stream (e.g., the overall message being communicated).

As shown in block 410, each data segment may be decrypted and authenticated using the segment's authentication tag. For instance, incremental authentication decryption module 320 may be configured to decrypt encrypted data 140 and to authenticate it using segment authentication tag 150, thereby generating authenticated decrypted data segment 330, according to one embodiment.

Additionally, the entire decrypted data stream may be authenticated using the final authentication tag, as shown in block 430. For example, incremental authenticated decryption component 320 may be configured to use final authentication tag 160 to authenticate decrypted plaintext 340.

In some embodiments, the individual data segments may be received and decrypted in order, while in other embodiments each data segment may be received and decrypted out of the actual sequence in the overall data stream. In other words, each data segment may be decrypted and authenticated independently. In some embodiments, this may allow for more parallel decryption and authentication of multiple data segments. Additionally, when communicating multiple encrypted data segments, the segments may be authenticated individually, possibly allowing data segments that do not authenticate properly to be resent without requiring the entire data stream to be resent.

Figure 5:
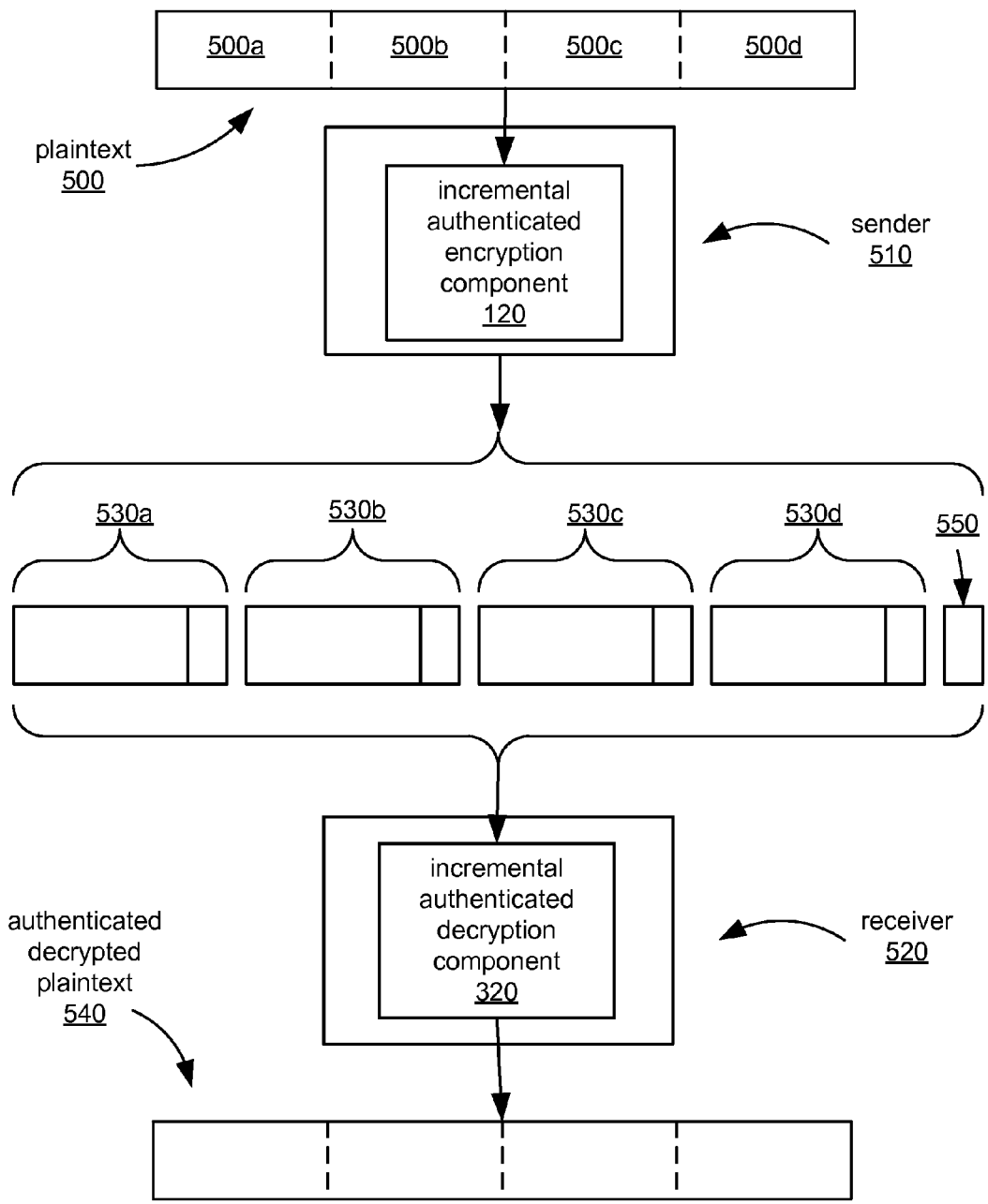
FIG. 5 is a logical block diagram illustrating communication of data using incremental authenticated encryption, as described herein.

FIG. 5 is a logical block diagram illustrating communication of data using incremental authenticated encryption, as described herein. As shown in FIG. 5, a plaintext 500 may be encrypted using incremental authenticated encryption by incremental authenticated encryption component 120 and may be communicated by sender 510 to receiver 520. The data may be decrypted and authenticated by incremental authenticated decryption component 320 resulting in authenticated decrypted plaintext 540.

As noted above, when communicating a large message (or other data stream), such as over a network, the message may be divided into multiple message parts, such as segments 500a-500d and each part may be encrypted independently. Additionally, each message part's authentication tag may also be generated independently (e.g., of any other message part's authentication tag). Each encrypted data segment, including its authentication tag, may then be communicated, as represented by data segments 530a-530d. Upon receipt any particular encrypted data segment may be decrypted and authenticated independently of the other data segments. After transmission of all the data segments, the entire message may be authenticated using the final authentication tag 550, which in some embodiments, may be generated based on the multiple segment authentication tags.

Figure 6:
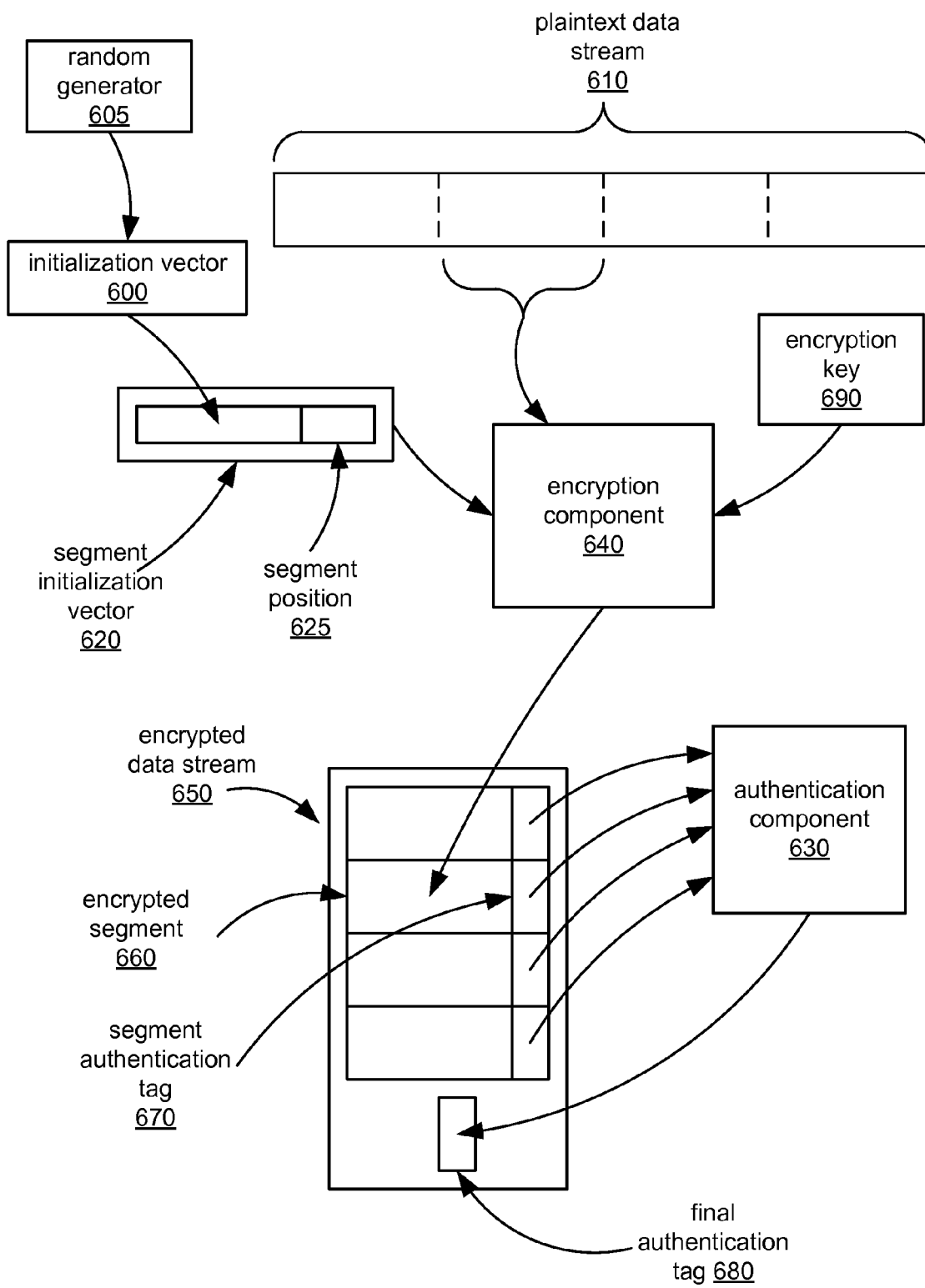
FIG. 6 is a logical block diagram illustrating more detailed encryption of a data segment according to incremental authenticated encryption, as in one embodiment.

FIG. 6 is a logical block diagram illustrating more detailed encryption of a data segment according to incremental authenticated encryption, as in one embodiment.

According to some embodiments, an authenticated encryption (AE) scheme for use when incremental authenticated encryption may be modeled as:

AE(NONCE, AAD, PLAINTEXT, KEY)=CIPHERTEXT, TAG

Where:
NONCE may represent a number that has size NONCE_BITSIZE and that may only be used once with any particular encryption key (e.g., to ensure maximum encryption security).
PLAINTEXT may represent the unencrypted message (or message part/segment).
KEY may represent the cryptographic key
AAD may represent additional authenticated data used in some encryption schemes
CIPHERTEXT may represent the encrypted version of the data
TAG may represent an authentication tag Incremental authenticated encryption may, according to various embodiments, also involve particular restrictions, such as, for example:
A maximum number of bytes that may be encrypted under a particular NONCE, KEY pair, referred to herein as MAX_SIZE.
A maximum number of times a particular encryption key may be used, referred to herein as MAX_KEY_USE.
A maximum number of data segments that are part of a single data stream being encrypted, referred to herein as MAX_PART. For example, When utilizing incremental authenticated encryption to encrypted multiple data segments using the same key, a different, unique NONCE may be used each time a piece of data is encrypted. For example, a NONCE may be incremented each time it is used, such as to ensure that no particular NONCE value is used more than once with a single encryption key. When generating an authentication tag for a data segment, the NONCE may be incremented once more.

As noted above, when utilizing incremented authenticated encryption, a single, individual encrypted data segment may be decrypted and authenticated without having to obtain, decrypt and/or authenticate the rest of the data from the overall data stream. According to some embodiments, individual segment NONCE values may be generated based on a single, initial NONCE value according to some embodiments. As used herein, such an initial NONCE value may be referred to as a PRE_NONCE.

In some embodiments, a PRE_NONCE may be considered an initial initialization vector and a NONCE may be considered a segment initialization vector. The terms PRE_NONCE and initial initialization vector may be used interchangeably herein. Similarly, the terms NONCE and segment initialization vector may be used interchangeably herein.

For example, as shown in FIG. 6, a single PRE_NONCE, such as initial initialization vector 600 may be used for incremental authenticated encryption of a plaintext data stream 610 and individual segment NONCE values, such as segment initialization vector 620, may be generated from the PRE_NONCE for use when encrypting individual data segments of the data stream, as will be described in more detail below.

In some embodiments, a PRE_NONCE, such as initialization vector 600, may be a randomly generated number, such as may be generated by random generator 605, which in some embodiments may represent a cryptographically secure random number generator. Any of various types of cryptographically secure random (or pseudo-random) number generators may be used when generating pre nonce values, according to various embodiments. In other embodiments, however, an initial initialization vector or PRE_NONCE, such as initialization vector 600, may be determined in manners other than by using random values.

The size of a PRE_NONCE may vary from embodiment to embodiment and may be determined based on a number of factors, such as the maximum number of segments of a data stream. For example, in one embodiment, each segment NONCE may be generated by combing the PRE_NONCE with a number indicating the position of the respective segment in the sequence of data segments. Thus, the size of the initial PRE_NONCE may be based, at least in part, on the amount of space (e.g., in bits) needed to represent the sequence number of a particular data segment. Thus, in one embodiment, the size of the PRE_NONCE may be equal to the maximum size of the NONCE (e.g., NONCE_BITSIZE) minus the size needed to represent the sequence number For instance, as one example, the size of a PRE_NONCE value may be equal to NONCE_BITSIZE minus the log based 2 of the MAX_PART rounded up to the nearest integer. The following represents a more formal description of this example relationship between the PRE_NONCE size and the maximum number of data segments:

Let $t >= \text{ceil}(\log\_2(\text{MAX\_PART}+1))$, the log based 2 of MAX_PART value rounded up to the nearest integer, and suppose t<NONCE_BITSIZE.

and

Let PRE_NONCE be a randomly generated value of bitlength NONCE_BITSIZE−t.

When performing incremental authenticated encryption, an encryption component, such as encryption component 640 and/or incremental authenticated encryption component 120 may use, as input to the encryption process, an encryption key 690, a message to encrypt M, such as plaintext data stream 610, and a PRE_NONCE 600. The output from the incremental authenticated encryption process may be the ciphertext, such as encrypted data stream 650 and final authentication tag 605. As noted above, the encrypted data stream may include multiple encrypted data segments, each of which may be encrypted, as well as decrypted and authenticated independently from others of the data segments. In some embodiments, encryption component 640 may represent the same component as incremental authenticated component 120.

Following is a more formal description of one embodiment of incremental authenticated encryption (IAE):
Input: A key K, a message M, a PRE_NONCE.
Output: ciphertext and authentication tag, $(C_1, TAG_1), \ldots, C_n, TAG_n)$, TAG.
Steps:
1. Break up M into parts, $M=M_1, \ldots, M_n$, n<=MAX_PART.
2. For i=1 to n
   a. Form NONCE=PRE_NONCE||i; where i is converted to a bitstring of length t.
   b. Compute $C_i$, $TAG_i$=AE(NONCE, NULL, $M_i$, K)
3. Form NONCE=PRE_NONCE||n+1; where (n+1) is converted to a bitstring of length t.
4. Compute TAG=AE(NONCE, $TAG_1$|| . . . ||$TAG_n$, NULL, K).

Output: $(C_1, TAG_1), \ldots, (C_n, TAG_n)$, TAG

As shown in the description above, a message or other data stream, such as plaintext data stream 610 may be broken, split or divided into multiple parts or data segments. For each data segment, a segment initialization vector (e.g., a NONCE), such as segment NONCE 620 may be generated. In the example above, the segment initialization vector may be generated by concatenating the initial initialization vector (e.g., PRE_NONCE), with a value indicating the position of the current data segment within the sequence of data segments (e.g., "i" in the above example), illustrated by segment position 625 in FIG. 6.

In other embodiments, a segment initialization vector may be generated in different manners and/or using different information. For instance, any of various sorts of information or metadata (e.g., metadata regarding the data to be, or that has been, encrypted) may be used when generating a segment initialization vector. In one embodiment, a number indicating the number of data segments prior to (and possibly including) the current segment) in the sequence of segments of the data stream may be used generating a segment authentication code. In another embodiment, a hash-based message authentication code (HMAC) may be applied to some (or all) of the data in one or more of the data segments up to and including the current data segment may be used when generating a segment authentication code. In yet another example embodiment, such an HMAC may be used as a segment authentication code.

Each data segment is then encrypted, shown by step 2b in the above example, such as by encryption component 640, using the encryption key, such as encryption key 690, and the respective segment initialization vector (e.g., NONCE in the above example), such as segment NONCE 620. Additionally, in some embodiments, the same segment initialization vector (e.g., NONCE or segment NONCE 620) may also be used to generate the segment authentication tag as part of the specific encryption algorithm used with incremental authenticated encryption.

For ease of discussion, incremental authenticated encryption was described above referencing a generic authentication scheme. However, in one possible example embodiment, an encryption scheme based on the Galois/counter mode (GCM) may be used with incremental authenticated encryption. Galois/Counter Mode (GCM) may be considered a mode of operation for symmetric key cryptographic block ciphers. CMD may be an authenticated encryption algorithm that provides both data authenticity (integrity) and confidentiality, in some embodiments. When implemented as part of incremented authenticated encryption, GCM may be defined for block ciphers with a block size of 128 bits.

In one embodiment, a GCM-based encryption schema utilized as part of incremented authenticated encryption may be defined as GCM-$AE_K$(IV, P, A), where IV may represent an initialization vector, P the plaintext to be encrypted and A may represent any additional authenticated data.

Thus, in some embodiments, the encryption scheme utilized by incremental authenticated encryption may support/require the following prerequisites:
- approved block cipher CIPH with a 128-bit block size, such as a symmetric encryption cipher;
- an encryption key K;
- definitions of supported input-output lengths;
- supported tag length t associated with the key.

When encrypting data, such as when encrypting the data of a data segment, encryption component 640 may provide/receive the following inputs:
- an initialization vector IV, such as initialization vector 600;
- the plaintext P, such as a data segment from plaintext data stream 610;
- any additional authenticated data A (e.g., whose length is supported).

Please note that any particular encryption scheme, such as GCM may only support inputs of a certain length, and therefore the inputs above may, in some embodiments be no longer than some defined length.

In some embodiments, the output of the particular encryption scheme utilized as part of incremental authenticated encryption may be defined as:
- the ciphertext C, such as the encrypted data of encrypted segment 660;
- authentication tag T, such as segment authenticated tag 670.

The following pseudo-code represents one example embodiment of a GCM-based encryption scheme that may be utilized as part of incremental authenticated encryption. For example, a hash key, H, may first be determined, which may be used by the GHASH function, discussed in more detail below.

1. Let $H=CIPH_K(0^{128})$.

In some embodiments, the initialization vector may be used to generate a hash, or pre-counter, block to be used as part of the actual symmetric encryption, shown below. For example, if the length of the initialization vector is equal to some pre-defined length (e.g., 96 in the example bellow), then the hash block $J_0$ may be formed by concatenating the initialization vector with a counter, such as segment position 650. If however, the length of the initialization vector is less than some pre-defined length (e.g., 96 in the example bellow), then the hash block $J_0$ may be formed by concatenating one or more pad bits to the initialization vector and applying the GHASH function to the concatenation, as shown in the pseudo-code example below. In some embodiments, segment initialization vector 620 may represent the hash block $J_0$ shown in the pseudo-code example below.

2. Define a block, $J_0$, as follows:
if len (IV)=96, then let $J_0=IV\|0^{31}\|1$.
if len(IV)≠96, then let s=128[len(IV)/128]−len(IV), and let $J_0=GHASH_H(IV\|0^{s+64}\|[len(IV)]_{64})$.

Continuing with the example implementation of a GCM-based encryption scheme for use with incremental authenticated encryption, the plaintext P, such as one data segment of plaintext data stream 610, may be encrypted using the encryption key K, such as encryption key 690 and with hash block $J_0$ formed above, such as segment initialization vector 620. Additionally, the hash block $J_0$ (e.g., the segment initialization vector) may be incremented, such as to ensure that the same initialization vector is never used more than once with the same encryption key.

3. Let $C=GCTR_K(inc_{32}(J_0, P))$.

An authentication tag used as part of incremental authenticated encryption may be generated in any of various manners, according to different embodiment. For instance, in one example embodiment, an authentication tag, such as segment authentication tags 150, and 670 may be generated by first applying the GHASH function (e.g., that uses the hash key H) to a concatenation of any additional authenticated data (A), the encrypted data (e.g., the ciphertext, C) and the lengths of both the additional authenticated data and the encrypted data. Additionally, the concatenation may be padded (e.g., with zero bits) to ensure a uniform length, as shown in the example below:

4. Let u=128·[len(C)/128]−len(C) and let v=128·[len(A)/128−len(A)]

5. Define a block, S, as follows:
$S=GHASH_H(A\|0^v\|C\|0^u\|[len(A)]_{64}\|[len(C)]_{64})$ In the example above, the output of the $GHASH_H$ function, S, may be considered the fingerprint of both the entire ciphertext (C) and any additionally authenticated data, A. Please note that a hash function used as part of incremental authenticated encryption, such as the GHASH function in the example above, may be a keyed hash function but may not be a cryptographic hash function. Thus, in some embodiments, the intermediate values used as part of the GCM-based encryption may be kept secret. For example, the hash subkey H in the above example may be kept secret and a public hash subkey may not be used.

Thus, the block S may then be encrypted using the symmetric encryption scheme GCTR using the encryption key, K and with the hash block described above. In other words, the authentication tag may be generated by inputting blocks of data to a keyed hashing function, and encrypting the result. The actual authentication tag may be generated by using only a portion of the encrypted block S, such as by using only a portion (e.g., such as the most significant bits) of the result of the encryption, as shown in the example below:

6. Let $T=MSB_t(GCTR_K(J_0,S))$.

7. Return (C,T).

Thus, the GCM-based encryption scheme may be utilized to generate both the encrypted data and the authentication tag. For instance, in one embodiment, the example GCM-based encryption scheme described above may be utilized to encrypt individual data segments and to generate corresponding segment authentication tags, such as encrypted data segments 140 and 660, as well as segment authentication tags 150 and 670.

Thus, as shown in the example above, the segment initialization vector (e.g., the pre-counter block $J_0$) may be generated from an initial initialization vector (e.g., the IV), according to one embodiment. Additionally, the authentication tag, such as segment authentication tag 670 may be generated using the same initialization vector, such as segment initialization vector 620, used to encrypt the data. However, as part of the specific encryption algorithm, the initialization vector may be modified (e.g., incremented) as part of the encryption algorithm, such as to ensure that the same initialization vector is not used more than once with the same encryption key. Thus, in some embodiments, the segment initialization vector may be generated using the position of the data segment within the sequence of data segments, as part of incremental authenticated encryption.

The hashing function described above may be implementing in any of various manners, according to different embodiments. For instance, the following pseudo-code represents one example embodiment of a hashing function that may be utilized with incremental authenticated encryption. Thus, a hash function may be defines as $GHASH_H(X)$, where H may represent the hash subkey and where X may represent a bit string.

According to some embodiments, the hashing function may involve/require the following prerequisites:

block H, the hash subkey.

Additionally, in some embodiments, the hashing function may involve/require the following as input:

bit string X such that len(X)=128 m for some positive integer m.

The output generated by the hashing function may, in some embodiments be defined as:

block $GHASH_H(X)$.

In some embodiments, a hashing function may take the input bit string and generate a new bit string by manipulating the input bits in any of various ways. For example, as shown by the pseudo-code below, a hashing function may generate an output bit string in which each bit of output is generated by XORing one bit of the input bit string with the immediately previous output bit and then applying the hash subkey. For instance, the following pseudo-code represents one example embodiment of a hashing function:

1. Let $X_1, X_2, \ldots, X_{m-1}, X_m$ denote the unique sequence of blocks such that $X = X_1 \| X_2 \| \ldots \| X_{m-1} \| X_m$
2. Let $Y_0 = Y$ be the "zero block", $0^{128}$
3. For i=1, ..., m, let $Y_i = (Y_{i-1} \oplus X_i) \cdot H$.
4. Return $Y_m$.

As described above, FIG. 6 illustrates the processing of a data segment from plaintext data stream 610 as part of encrypting the multiple data segments of the plaintext data stream. As described above, the data segment may be encrypted using segment initialization vector 620 and encryption key 690 to generate encrypted segment 660 and segment authentication tag 670 in encrypted data stream 650. Additionally, encryption component 640 may be used to generate final authentication tag 680, which may, in one embodiment, correspond to steps 3 and 4 in the example above. In other embodiments, final authentication tags may be generated in other, different manners.

Figure 7:
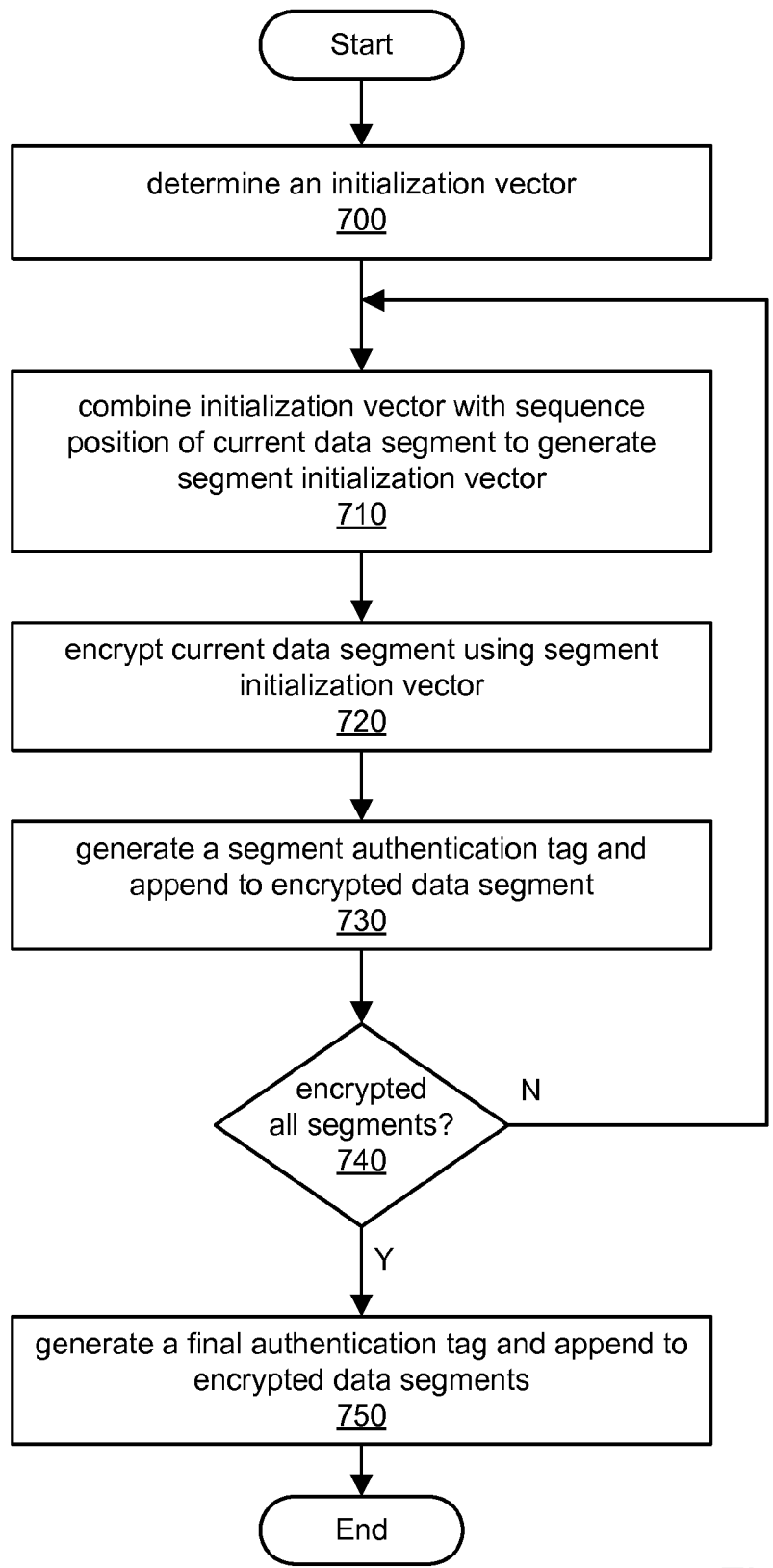
FIG. 7 is flowchart illustrating one embodiment of a method for encryption according to incremental authenticated encryption, as described herein.

FIG. 7 is flowchart illustrating one embodiment of a method for encrypting one of multiple data segments according to incremental authenticated encryption, as described herein. As shown in block 700, a module or component of a computing device configured to implement incremental authenticated encryption, such as incremental authentication encryption component 120, may be configured to determine an initialization vector. As noted above, in one embodiment, an initialization vector may be considered a PRE_NONCE and may be based on a randomly generated number.

Incremental authentication encryption component 120 may combine the initialization vector with a value indicating the position of the current data segment in the sequence of multiple data segments to generate a segment initialization vector, such as segment initialization vector 620, as shown in block 710. For example, when processing the first data segment in a sequence of data segments, the initialization vector may be combined with the number 1 (e.g., a bit stream representing the number 1) and while processing the second data segment in the sequence, the initialization vector may be combined with the number 2. The initialization vector and the sequence number may be combined in any of various manners, according to various embodiments. For example, in some embodiments, the initialization vector and sequence number may be concatenated together.

In some embodiments, a segment initialization vector may be considered a segment NONCE.

As shown in block 720, incremental authentication encryption component 120 may be configured to encrypt the current data segment using the segment initialization vector. As noted above, any of various encryption schemes may be used with incremental authenticated encryption, according to various embodiments, and the specific encryption scheme used may vary from embodiment to embodiment. For example, in one embodiment, a symmetric key encryption based on the Galois/counter mode (GCM) may be used with incremental authenticated encryption and the segment initialization vector may be used as, or be the basis of, the counter in the GCM encryption.

Incremental authentication encryption component 120 may also be configured to generate (e.g., compute) a segment authentication tag, such as segment authentication tag 670, and append the segment authentication tag to the encrypted data segment, as shown in block 730. For example, incremental authentication encryption component 120 may be encrypted data segments as part of a multi-segment message to be transmitted, such as over a network or other communication fabric, and a segment's corresponding segment authentication tag may be appended to the encrypted data segment and transmitted with it.

thus, as illustrated by decision block 740, incremental authentication encryption component 120 may be encrypting multiple data segments and if all the segments have not been encrypted yet, as indicated by the negative output of decision block 740, incremental authentication encryption component 120 may begin to process the next data segment, as indicated by the positive output of decision block 740.

As noted above, when utilizing incremental authenticated encryption, individual data segments may be encrypted independently of others from the same data stream. Thus, while in some embodiments, the method illustrated in FIG. 7 may represent incremental authentication encryption component 120 encrypting all of multiple data segments in the order that they occur in the overall data stream. However, in other embodiments, incremental authentication encryption component 120 may be encrypting only a portion of the multiple data segments and may be processing non-contiguous data segments from the data stream. For example, multiple encryption components (or modules) may be configured to process (e.g., encrypt) the data segments of a data stream in parallel and therefore incremental authentication encryption component 120 may not be processing continuous ones of the data segments. When processing data segments independently of the other data segments, incremental authentication encryption component 120 may still need to know the position of the respective data segment within the overall sequence of the data segments in the data stream being encrypted.

If, as indicate by the positive output of decision block 740, all the data segments (e.g., of the data stream being encrypted) have been encrypted, incremental authentication encryption component 120 may be configured to generate a final authentication tag and append it to the encrypted data segments, as shown in block 750. For example, in one embodiment, incremental authentication encryption component 120 may be configured to utilize an authentication component, such as authentication component 630, to generate (e.g., compute) a final authentication tag, such as final authentication tag 680. While shown separately from each other, in some embodiments, authentication component 630 may be the same as, part of, or merely a logical division of, encryption component 640.

In some embodiments, the final authentication tag may be generated based on all the individual segment authentication tags for the multiple data segments of the data stream being encrypted. For example, in one embodiment, a concatenation of the segment authentication tags may be encrypted with an initialization vector (e.g., a NONCE) to generate the final authentication tag. In some embodiments, the NONCE used to encrypt the segment authentication tags when generating a final authentication tag may be generated in the same manner as a segment initialization vector (e.g., segment NONCE) but with a position value representing one more than the number of actual segments in the data stream. As one non-limiting example, if a data stream is encrypted using 4 data segments, a concatenation of the 4 segment authentication tags may be encrypted using an initialization vector using a position value of 5, in one embodiment.

Thus, in some embodiments, an encryption component, such as encryption component 640 may be configured to temporarily hold or store the individual segment authentication tags, or a concatenation of them, for use when generating the final authentication tag. For example, encryption component 640 may be configured to add a segment authentication tag to the concatenation after each segment authentication tag is generated and use the concatenation when generating the final authentication tag. The encryption component may not have to hold or store the actual segment data however, according to one embodiment.

A final authentication tag may be appended to the multiple encrypted data segments, according to some embodiments. For example, if a message is being encrypted using incremental authenticated encryption, a final authentication tag may be send after all the individual encrypted data segments have been transmitted (e.g., with their respective segment authentication tags). A final authentication tag may be used to authenticate or validate the multiple data segments as a whole (e.g., the entire data stream).

In other embodiments, however, a final authentication tag may not be appended to the encrypted data segments, but may be saved, stored, or transmitted separately.

In some embodiments, a final authentication tag may be based on all the segment authentication tags. For example, a final authentication tag may be generated by using the concatenated segment authentication tags as additional authentication data (AAD) in an encryption process that does not include any actual data to be encrypted. For instance, the following pseudo-code illustrates one possible embodiment of generating a final authentication tag based on the segment authentication tags, where AE represents an encryption method, K represents the encryption KEY, PRE_NONCE represents an initialization vector, n represents the number of data segments (and therefore the number of segment authentication tags), and $TAG_1 \ldots TAG_n$, represent the segment authentication tags:

NONCE=PRE_NONCE∥n+1; where (n+1) is converted to a bitstring of length t.

TAG=AE(NONCE, $TAG_1$∥ . . . ∥$TAG_n$, NULL, K).

Please note that in other embodiments, a final authentication tag may be generated in different manners, or may not be generated (or used) at all.

As noted above, each data segment may be encrypted independently. For example, when transmitting a large message using incremental authenticated encryption, whenever a message part $M_i$ is known, Cm and $TAG_m$ can be computed (and therefore transmitted) independently of the other parts. Thus, in some embodiments, a system implementing incremental authenticated encryption may not have to hold all of a data stream being encrypted at any given time.

Figure 8:
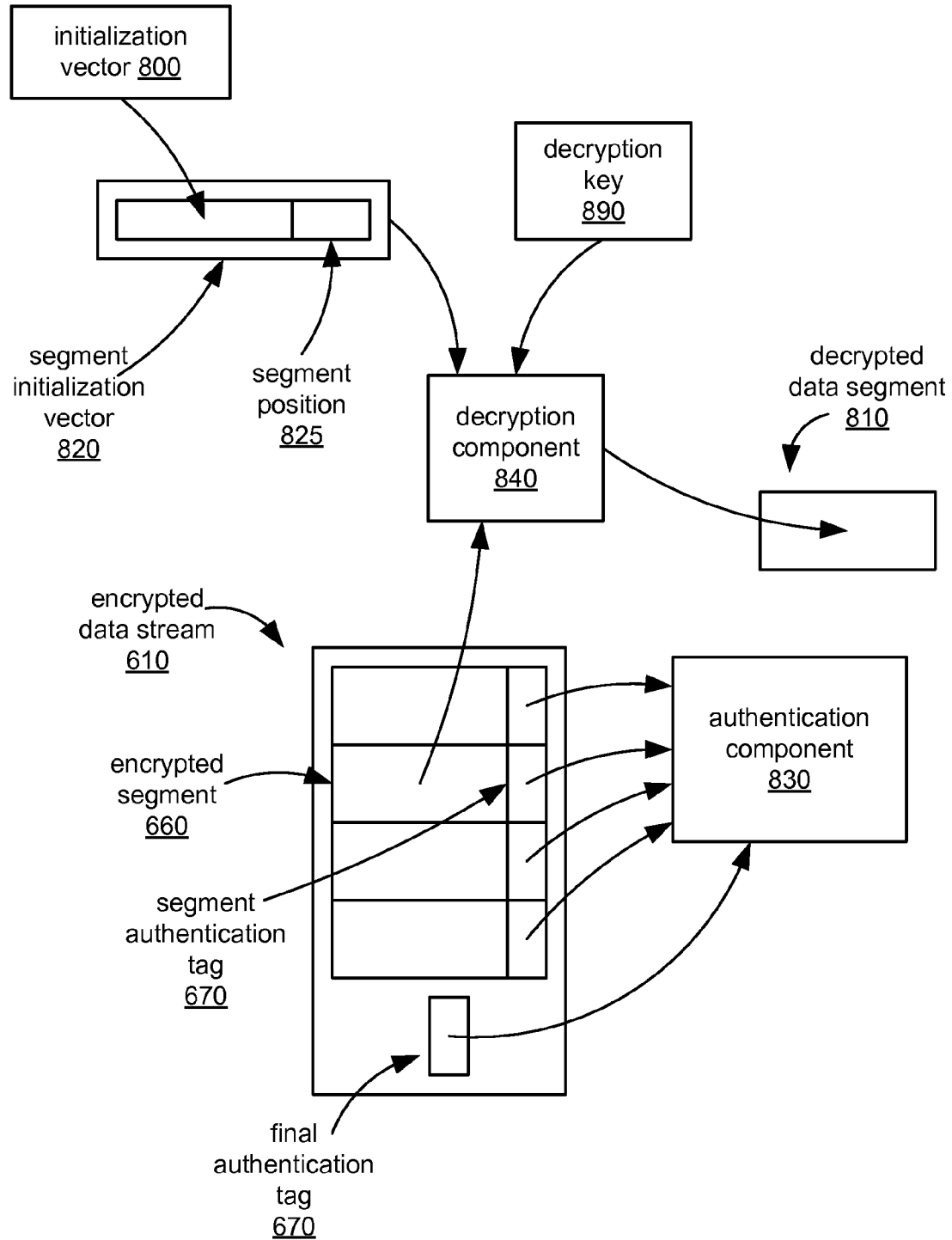
FIG. 8 is a logical block diagram illustrating decryption according to incremental authenticated encryption, as described herein.

FIG. 8 is a logical block diagram illustrating decryption according to incremental authenticated encryption, as described herein. A decryption component of a computing system, such as decryption component 840 and/or incremental authenticated encryption component 320, may be configured to decrypt one or more data segments of a previously encrypted data stream. For example, decryption component 840 may decrypt one or data segments that are part of a large message being received over a network. As another example, a large file of data may be stored encrypted using incremental authenticated encryption (e.g., so that the entire file does not have to be read and authenticated just to use a smaller portion) and decryption component 840 may be reading, decrypting and authenticating one or more data segments of it. In some embodiments, decryption component 840 may represent the same component as incremental authenticated decryption component 320. Additionally, in some embodiments, authentication component 830 may be the same as, part of, or merely a logical division of, authentication component 830.

When decrypting and authenticated one or more data segments of an encrypted data stream, such as encrypted data stream 610, decryption component 840 may be configured to utilize an initial initialization vector as well as segment initialization vector in the same manner as when a data segment is encrypted, according to some embodiments. For example, in some embodiments, incremental authenticated encryption may utilize one or more symmetric encryption schemes and therefore the same initialization vectors as used during encryption may be required for proper decryption.

Thus, decryption component 840 may generate a segment initialization vector 820 using an initial initialization vector 800 and a segment position 825. Please note that the various methods of generating a segment initialization vector (e.g., segment NONCE) discussed above regarding encryption may also be used regarding decryption, according to various embodiments.

Similarly, decryption key 890 may represent the same key as encryption key 690, described above. Thus, decryption component 840 may decrypt encrypted segment 660 from encrypted data stream 610 using segment initialization vector 820 and decryption key 890 to generate decrypted data segment 810.

In some embodiments, decryption component 840 may be configured to authenticate the data segment being decrypted, either before, during or after decrypting the data from the encrypted data segment. For example, in some embodiments, decryption component 840 may authenticate a segment prior to decrypting the data of the segment, and may be configured to not decrypt the segment if the authentication fails. In yet other embodiments, decryption component 840 may be configured to decrypt the data of the data segment prior to authenticating the segment.

In one embodiment, decryption component 840 may be configured to utilize authentication component 830 to authenticate the data segment, as will be discussed in more detail below. Similarly, decryption component 840 may authenticate, such as by utilizing authentication component 830, the entire encrypted data stream, as will be discussed in more detail below. While shown separately, in some embodiments, authentication component 830 may be the same as, part of, or merely a logical division of, decryption component 840.

In some embodiments, decryption component 840 may be configured to decrypt an entire encrypted data stream without authenticating each segment using its corresponding segment authentication tag. Instead, decryption component 840 may be configured to authenticate the multiple data segments as a whole (e.g., the entire data stream) using the final authentication tag. In other words, in some embodiments, the data segments may be decrypted, but ignoring the segment authentication tags, using only the final authentication tag to authenticate the multiple data segments (e.g., the entire data stream).

Figure 9:
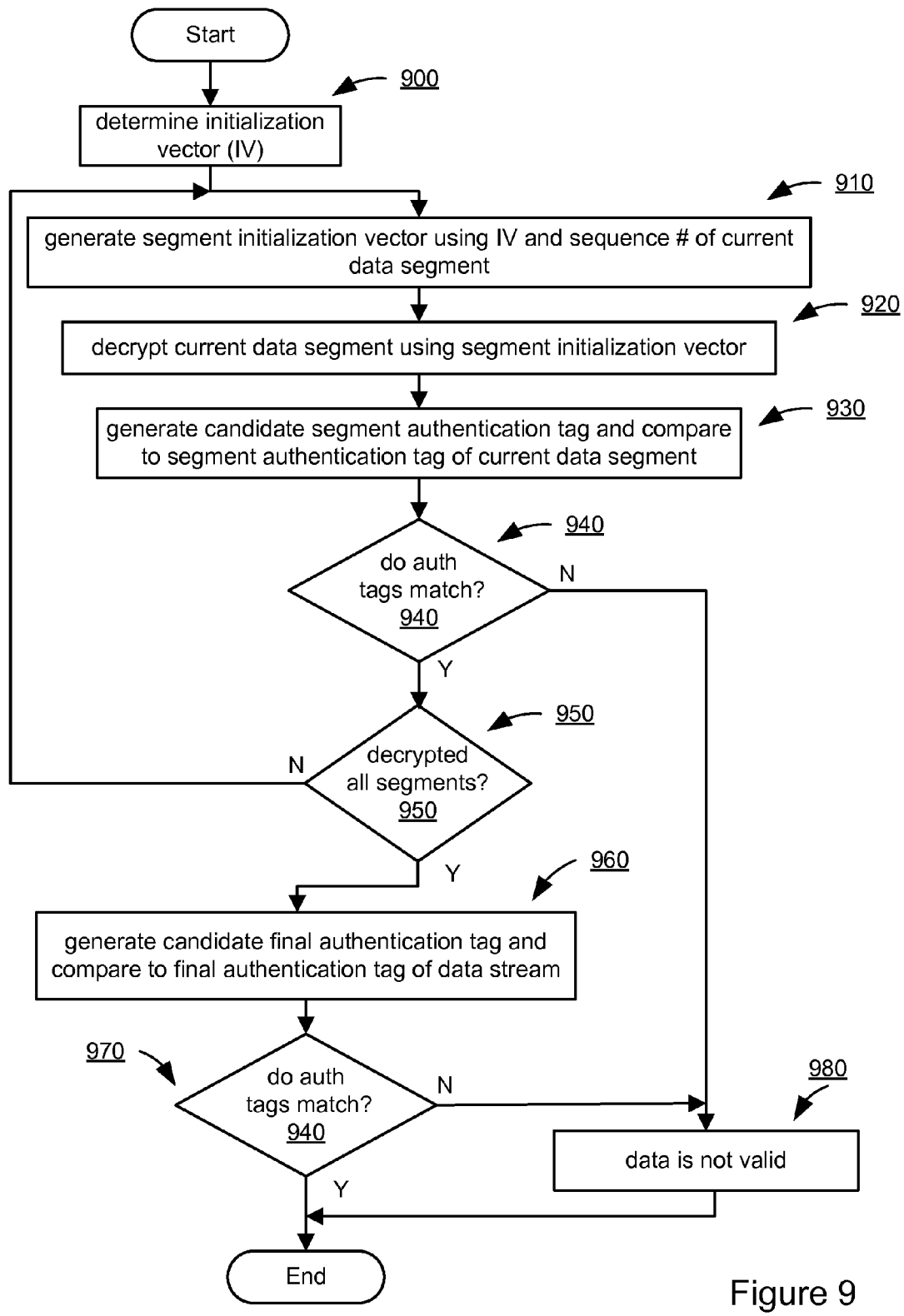
FIG. 9 is a flowchart illustrating one embodiment of a method for decryption according to incremental authenticated encryption, as described herein.

FIG. 9 is a flowchart illustrating one embodiment of a method for decryption according to incremental authenticated encryption, as described herein. As shown in block 900, decryption component 840 may determine an initialization vector (IV), such as initialization vector 800. Decryption component 840 may then being to process one or more encrypted data segments, as illustrated by the loops shown in FIG. 9.

As shown in block 910, decryption component 840 may be configured to generate a segment initialization vector using the IV and the sequence number of the current data segment, according to one embodiment. As described above regarding encryption, a segment initialization vector may include a concatenation of the initial initialization vector and a value indicating the position of the current segment within the sequence of data segments of the overall data stream. As with encryption, decryption utilizing incremental authenticated encryption may use multiple, individual segment initialization vectors based on a single initial initialization vector.

Decryption component 840 may also be configured to decrypt the current data segment using the segment initialization vector, as shown in block 920. Decryption component 840 may also use other things, such as decryption key 890, when decrypting the data segment. As shown in block 930, decryption component 840 may generate a candidate segment authentication tag and compare it to the segment authentication tag with the current data segment. In some embodiments, decryption component 840 may utilize authentication component 830 to generate a candidate authentication tag and/or to compare the candidate authentication tag to the segment authentication tag for the current data segment.

If, as indicated by the negative output of decision block 940, the candidate authentication tag does not match the current segment authentication tag, decryption component 840 may determine that that current data segment is not valid, as shown in block 980, and may stop processing (e.g., decrypting) the one or more data segments. If however, the authorization tags do match, as indicated by the positive output of block 940, decryption component 840 may continue to process additional data segments, if there are additional ones to process.

Thus, if not all the data segments have been decrypted, as indicated by the negative output of decision block 950, decryption component 840 may begin processing the next data segment. As noted above, data segments encrypted utilizing incremental authenticated encryption may be decrypted independently of each other, and therefore, decryption component 840 may process multiple data segments that are not contiguous within the overall data stream or may process only a single data segment of multiple data segments in an encrypted data stream. For example, multiple data segments may be decrypted in parallel by multiple decryption modules/components.

When decrypting a data segment independently, decryption component 840 may have to know the sequence number of the data segment (e.g., the position of the data segment within the overall data stream in relation to the data segments), such as to properly generate a segment initialization vector, according to some embodiments. The sequence information regarding a data segment may be communicated in various manners according to different embodiments.

If, however, all the individual data segments have been decrypted, as indicated by the positive output of decision block 950, decryption component 840 may be configured to authenticate the multiple data segments of a data stream as a whole, according to some embodiments. In other words, if all the data segments of an encrypted data stream have been decrypted and properly authenticated, the data stream as a whole may also be authenticated. In some embodiments, even though each individual data segment authenticated properly, the multiple data segments may be authenticated as whole, such as to authenticate that they are in the same order within the data stream as when encrypted.

Thus, as shown in block 960, decryption component 840 may, or may utilize authentication component 830 to, generate a candidate final authentication tag and compare it to the final authentication tag of the data stream. If, as indicated by the negative output of decision block 940, the tags do not match, decryption component 840 and/or authentication component 830 may determine that the data is not valid, as shown in block 980. According to some embodiments, the candidate final authentication tag may be generated using all the segment authentication tags and in the same manner as during encryption.

As with encryption described above, in some embodiments, a GCM-based encryption model may be utilized during decryption in incremental authenticated encryption. Indeed, when using a symmetric encryption scheme, a GCM-based encryption model may have to be used for decryption if one was used for encryption, according to some embodiments.

The following example pseudo-code represents one possible example embodiment of a decryption algorithm for use with incremental authenticated encryption. An example decryption function may be defined as: $CGM\text{-}AD_k(IV,C,A,T)$ where IV may represent an initialization vector, C may represent the encrypted ciphertext, A may represent any additional authenticated data, and T may represent the authentication tag. Thus, when used to decrypt an encrypted data segment, as noted above, IV may represent segment initialization vector 820, C may represent encrypted segment 680 and T may represent segment authentication tag 670.

A GCM-based decryption algorithm may, in one embodiment, involve the following prerequisites:
- an approved block cipher CIPH with a 128-bit block size;
- a decryption key K;
- definitions of supported input-output length;
- supported tag length t associated with the key.

Similarly, a GCM-based decryption algorithm may, in one embodiment, involve the following inputs, noted above:
- initialization vector IV;
- ciphertext C;
- additional authentication data A;
- authentication tag T;

The output of the CGM-based decryption algorithm may include:
- The plaintext P, such as decrypted data segment 810, or FAIL—an indication of inauthenticity (e.g., the authentication tag check failed).

The following example steps represent one possible example embodiment of a GCM-based decryption algorithm for use with incremental authenticated encryption. For example, the decryption algorithm may return a failure indication if the lengths of any of the inputs are not supported (e.g., either too long or too short):

1. If the bit lengths of IV, A or C are not supported, or if len(T)≠T, then return FAIL.

As with the example GCM-based encryption algorithm discussed above, a hash subkey and a pre-counter block $J_0$ may be generated. In some embodiments, the segment initialization vector 820 may represent a pre-counter block $J_0$.

2. Let $H=CIPH_K(0^{128})$.
3. Define a block, $J_0$, as follows:
   $J_0=GHASH_H(IV\|0^{s+64}\|[len(IV)]_{64})$.

The encrypted ciphertext, such as encrypted segment 660 may be decrypted, such as by using the same symmetric encryption mode used during encryption. The ciphertext may be decrypted with the decryption key, such as decryption key 890, and using the pre-counter block $J_0$, such as segment initialization vector 820. In some embodiments, the segment initialization vector (e.g., the pre-counter block $J_0$) may be incremented, such as to prevent the same initialization vector from being used more than once with the same decryption key. The result of the decryption function may provide the plaintext, such as decrypted data segment 810, according to some embodiments.

4. Let $P=GCTR_K(inc_{32}(J_0), C)$.

As well as decrypting the ciphertext, the decryption algorithm may also authenticate the data being decrypted, such as by generating a candidate authentication tag and comparing it to the tag supplied with the encrypted data. For example, the same methodology used to generate the authentication tag, such as segment authentication tag 670, may be used to generate a candidate authentication tag. Thus, in the example pseudo-code below, a candidate authentication tag may be generated by first applying the GHASH function (e.g., that uses the hash key H) to a concatenation of any additional authenticated data (A), the encrypted data (e.g., the ciphertext, C) and the lengths of both the additional authenticated data and the encrypted data. Additionally, the concatenation may be padded (e.g., with zero bits) to ensure a uniform length, as shown in the example below:

5. Let $u=128\cdot[len(C)/128]-len(C)$
   and
   let $v=128\cdot[len(A)/128-len(A)]$
6. Define a block, S, as follows:
   $S=GHASH_H(A\|0^v\|C\|0^u\|[len(A)]\|[len(C)]_{64})$ It should be noted that, as described above regarding the example encryption algorithm, a hash function used as part of incremental authenticated encryption, such as the GHASH function in the example above, may be a keyed hash function but may not be a cryptographic hash function. Thus, in some embodiments, the intermediate values used as part of the GCM-based decryption may be kept secret.

The example block S may then be encrypted using the symmetric encryption scheme GCTR using the encryption/decryption key, K, and with the hash block described above. The candidate authentication tag may, in some embodiments, be generated by using only a portion of the encrypted block S, such as by using only a portion (e.g., such as the most significant bits) of the result of the encryption, as shown in the example below.

7. Let $T'=MSB_t(GCTR_K(J_0,S))$.

The candidate authentication tag may then be compared to the actual authentication tag corresponding to the encrypted data to determine whether the decrypted data is valid or not:

8. If T=T', then return P; else return FAIL.

The example GCM-based decryption algorithm described above represents one possible embodiment of a decryption algorithm that may be utilized, such as by decryption component 840 and/or incremental authenticated decryption component 320, as part of incremental authenticated encryption, as described herein. For example, the above example algorithm may be used when decrypting each encrypted data segment, with a different (e.g., incremented) segment initialization vector being provided each time. Other and/or different decryption algorithms may be used in various embodiments.

While in some embodiments, as described above, a single segment initialization vector may be used for both encrypted the data of the segment and for generating the segment authentication tag, in other embodiments, separate initialization vectors may be used for encrypting the data and generating the segment authentication tag. For example, as will be described in more detail below, the same initial initialization vector may be used to generate two different segment initialization vectors, one for use when encrypting the data and another for generating the segment authentication tag.

Figure 10:
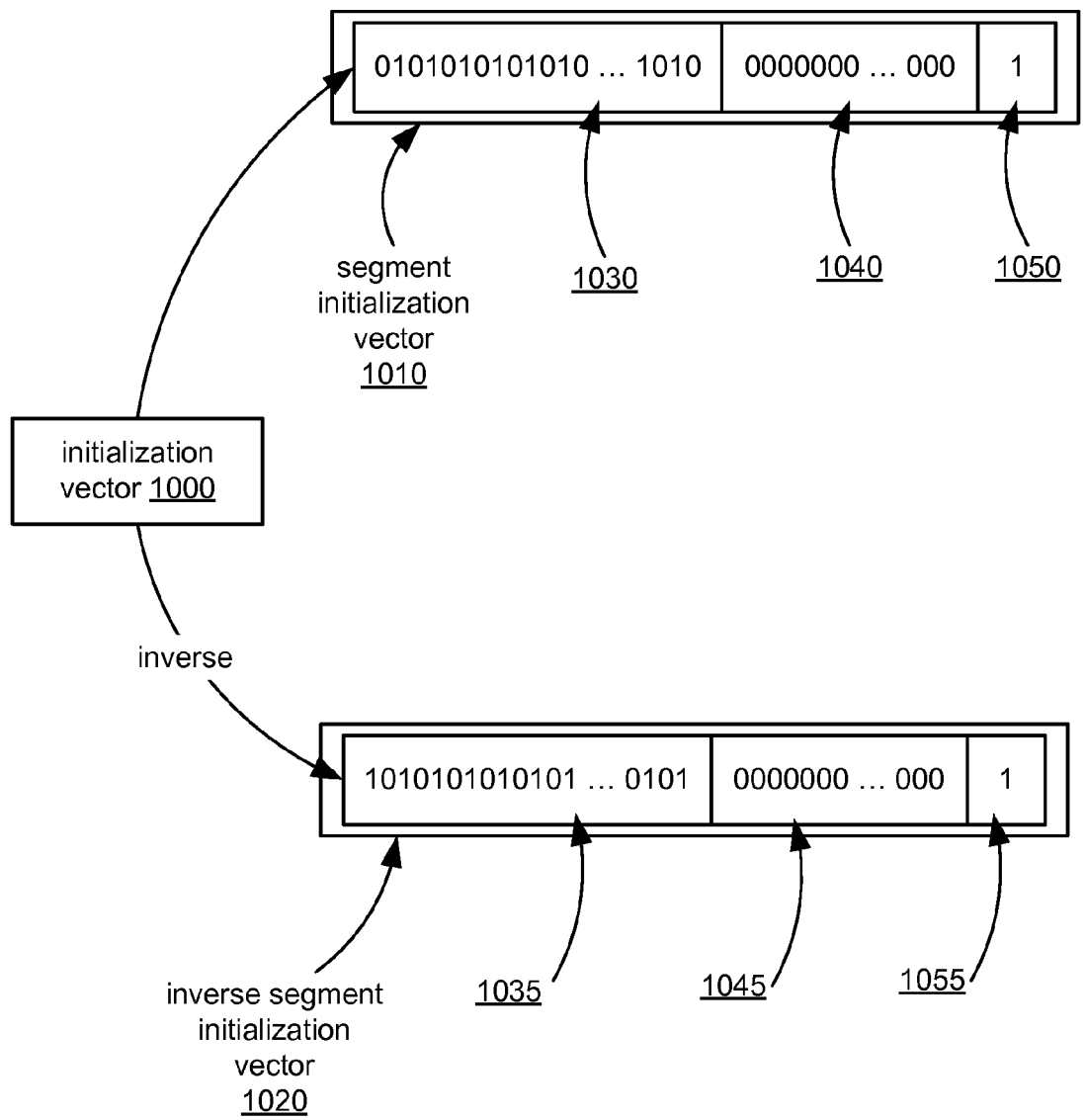
FIG. 10 is a logical block diagram illustrating a segment initialization vector and an inverse segment initialization vector according to one embodiment.

FIG. 10 is a logical block diagram illustrating a segment initialization vector and an inverse segment initialization vector according to one embodiment. A single initial initialization vector 1000 may be used to generate two different segment initialization vectors, segment initialization vector 1010 and inverse segment initialization vector 1020. The actual segment initialization vectors may be generated in any of various manners, according to different embodiments. For example, segment initialization vector 101 may be generated as a concatenation of the value 1030 of initialization vector 1000 and a counter value, represented by values 1040 and 1050. Similarly, inverse segment initialization vector 1020 may be generated as a concatenation, but using the value 1035 representing the inverse (or complement) of initialization vector 1000, as well as a counter value, represented by values 1045 and 1055.

As noted above, one segment initialization vector, such as segment initialization vector 1010 may be used to encrypt the data, while another segment initialization vector, such as inverse initialization vector 1020 may be used to generate the segment authentication tag, according to some embodiments.

Figure 11:
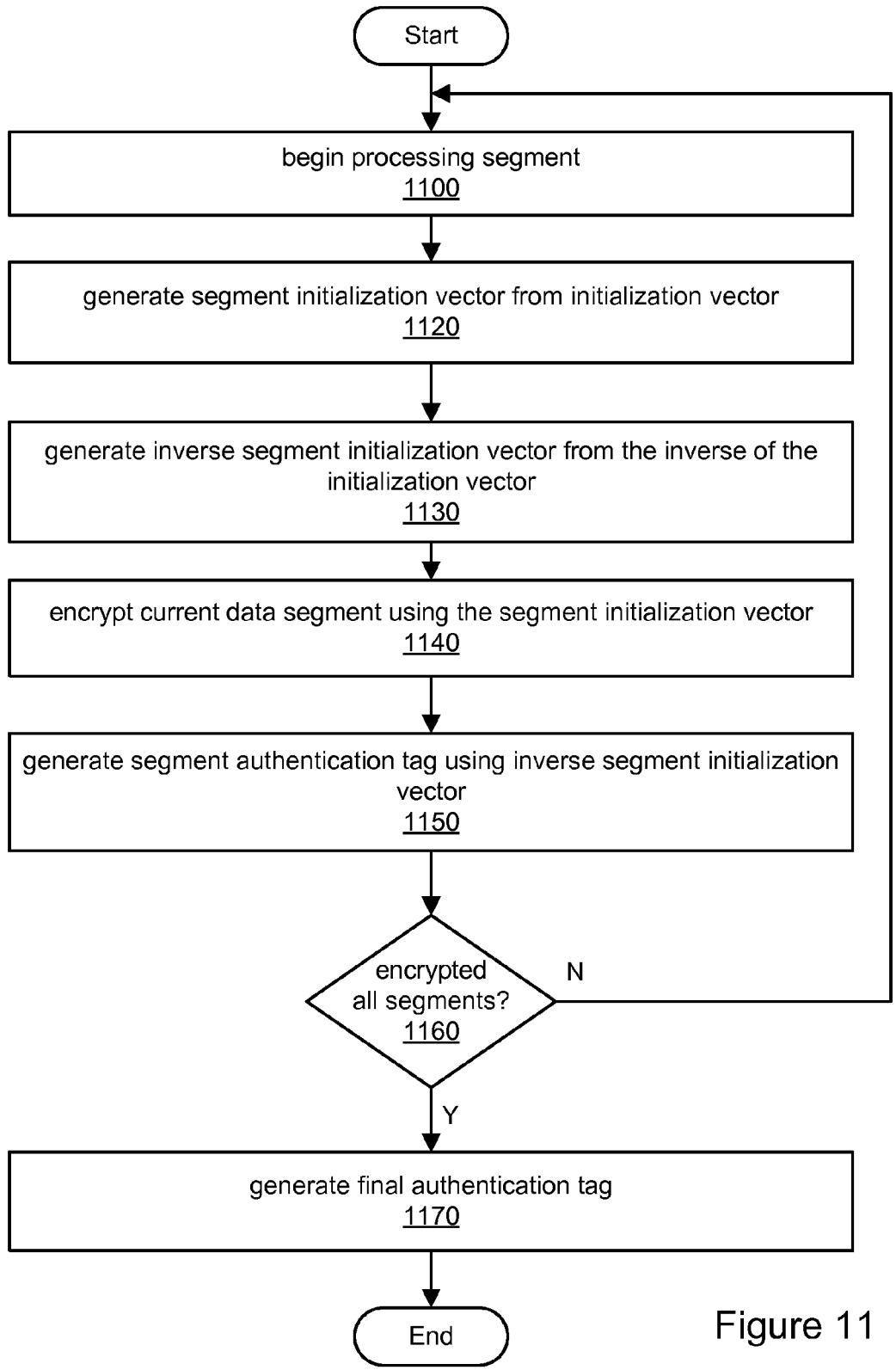
FIG. 11 is a flowchart illustrating one embodiment of a method for using two segment initialization vectors, according to incremental authenticated encryption.

FIG. 11 is a flowchart illustrating one embodiment of a method for using two segment initialization vectors, according to incremental authenticated encryption. As described above, incremental authenticated encryption may involve encrypting one or more data segments of a data stream. As shown in block 1100, an encryption component, such as encryption component 640 may begin processing a segment, such as one of multiple data segments of a data stream to be encrypted. Encryption component 640 may then generate a segment initialization vector 1010 from an initial initialization vector, as shown in block 1120. As described above, an initial initialization vector, such as initialization vector 1000, may be determined and/or generated in any of various manners, such by using a random number generator, as in one embodiment. Alternatively, the initial initialization vector may be provided by a user, or other component managing the overall encryption of multiple data segments.

As shown in block 1130, encryption component 640 may also generate an inverse segment initialization vector 1020 from the inverse (or complement) of the initialization vector. For example, as described above the inverse (or complement) of initialization vector 1000 may be used as the basis for generating inverse segment initialization vector 1020, according to some embodiments. Encryption component 640 may then encrypt the current data segment using the generated segment initialization vector 1010, as shown in block 1140. In some embodiments, the encryption of the data in the current data segment may be performed as described above, such as by using a GCM-base encryption method. In other embodiments, the encryption of the data segment may be performed in different manners, as will be discussed in more detail below.

Encryption component 640 may also generate the segment authentication tag using the inverse segment initialization vector, as shown in block 1150. The exact nature of a segment authentication tag may vary from embodiment to embodiment, as will be discussed in more detail below.

As illustrated by decision block 1160, encryption component 640 may be configured to process (e.g., encrypt) one or more data segments. Thus, if all the segments have not been encrypted, as indicated by the negative output of decision block 1160, encryption component 640 may continue to process the remaining data segments. If all the segments have been encrypted, as illustrated by the positive output of decision block 1160, encryption component 640 may then generate a final authentication tag, as shown in block 1170. A final authentication tag may be generated in any of various manners, according to different embodiments. For example, in one embodiment, a final authentication tag may be generated based on a combination (e.g., concatenation) of the individual segment authentication tags, as described above. In another embodiment, a final authentication tag may be based on a hash of all the data (either plaintext or encrypted) in the data stream. In yet another embodiment, a final authentication tag may be generated based on metadata or summary information regarding the individual segment authentication tags and/or the actual data in one or more of the data segments. In one embodiment, the summary information may include a concatenation of the individual segment authentication tags.

In some embodiments, encrypted component 640 may be configured to hold or store, at least temporarily, the individual segment authentication tags, without necessarily holding or storing the actual data (either plaintext or encrypted) from the data segments. In other embodiments, rather than holding or storing the segment authentication tags, encrypted component 640 may be configured to hold or store, at least temporarily, metadata or summary information, such as a concatenation, regarding the individual segment authentication tags (e.g., for use when generating a final authentication tag).

However, in other embodiments, a final authentication tag, such as final authentication tag 670, may be generated based on the total encrypted data and the incremented initialization vector, such as segment initialization vector 1010, used to encrypt the data. For instance, a hash block based on the encrypted data may be encrypted with the segment initialization vector (e.g., after being incremented) using the encryption key to generate a final authentication tag.

For ease of discussion, incremental authenticated encryption was described above referencing a generic authentication scheme. However, in one possible example embodiment, an encryption scheme based on the Galois/counter mode (GCM) may be used with incremental authenticated encryption and utilizing an inverse segment initialization vector for generating segment authentication tags. For example, in one embodiment, a GCM-based encryption schema may be defined as $GCM\text{-}AE_K(IV,P,A,M)$, where IV may represent an initialization vector, P the plaintext to be encrypted, A may represent any additional authenticated data and M may represent the size of each data segment within the stream of data. In the example embodiment illustrated by the following pseudo code, an additional pre-counter block $J_1$, which may represent an inverse segment initialization vector may be generated from the inverse (or complement) of the initial initialization vector.

Thus, in one embodiment, an encryption algorithm utilized by incremental authenticated encryption may support/require the following additional input:

M=size in kilobytes($2^{10}$) of each chunk of plaintext for purposes of incremental authentication (e.g., the generation of segment authentication tags).

The example GCM-based encryption algorithm may provide the following output:

ciphertext C which may also include the segment authentication tags, $\hat{T}_i$ (for i=1 to n), as well as the final authentication tag T.

As described above, incremental authenticated encryption may insert a secured incremental authentication tag ($\hat{T}_i$) at regular intervals of the ciphertext so that the ciphertext between two consecutive and can be decrypted and authenticated without the need to decrypt and authenticate the entire data. Each segment may be encrypted using the same function and key for the data blocks, but with a different initial counter block (e.g., segment initialization vector) so that no nonce may ever be used more than once for encryption using the same key.

As described above, a segment authentication tag may be appended to the encrypted data of the corresponding data segment and the final authentication tag may be appended to the end of all the encrypted data segments and segment authentication tags, according to some embodiments.

One embodiment of a GCM-based incremental authenticated encryption algorithm may involve the following steps. For example, a hash key, H, may first be determined, which may be used by the GHASH function, discussed in more detail below.

1. Let $H=CIPH_K(0^{128})$.

In some embodiments, the initialization vector may be used to generate a hash, or pre-counter, block to be used as part of the actual symmetric encryption, shown below. For example, if the length of the initialization vector is equal to some pre-defined length (e.g., 96 in the example bellow), then the hash block $J_0$ may be formed by concatenating the initialization vector with a counter. If however, the length of the initialization vector is less than some pre-defined length (e.g., 96 in the example bellow), then the hash block $J_0$ may be formed by concatenating one or more pad bits to the initialization vector and applying the GHASH function to the concatenation, as shown in the pseudo-code example below. In some embodiments, segment initialization vector 620 may represent the hash block $J_0$ shown in the pseudo-code example below.

2. Define a block, J0, as follows:
    if len (IV)=96, then let $J_0=IV\|0^{31}\|1$
    if len(IV)≠96, then let s=128[len(IV)/128]−len(IV), and let
    $J_0=GHASH_H(IV\|0^{s+64}\|[len(IV)]_{64})$.

In some embodiments, an inverse segment authentication vector may be generated based on the inverse of the initial initialization vector. Thus, as shown in the example pseudo-code below, the inverse of the initial initialization vector may be used to generate a block $J_1$, which may represent an inverse segment initialization vector.

Define a block $IV_1$, as follows:
    $IV_1$=xor (IV, $1^{len(IV)}$)

As shown in the example pseudo-code below, the inverse of the initial initialization vector $IV_1$ may be used to generate a hash, or pre-counter, block $J_1$, which may represent an inverse segment initialization vector, to be used as part of the actual symmetric encryption, shown below. For example, if the length of the inverse initialization vector is equal to some pre-defined length (e.g., 96 in the example bellow), then the hash block $J_1$ may be formed by concatenating the initialization vector with a counter. If however, the length of the inverse initialization vector is less than some pre-defined length (e.g., 96 in the example bellow), then the hash block $J_1$ may be formed by concatenating one or more pad bits to the initialization vector and applying the GHASH function to the concatenation, as shown in the pseudo-code example below. In some embodiments, inverse segment initialization vector 1020 may represent the hash block $J_1$ shown in the pseudo-code example below.

Define a block $J_1$, using the same algorithm as for $J_0$, except substituting IV with $IV_1$:
    if len ($IV_1$)=96, then let $J_1=IV_1\|0^{31}\|1$.
    if len($IV_1$)≠96, then let s=128[len($IV_1$)/128]−len($IV_1$), and let
    $J_1=GHASH_H (IV_1\|0^{s+64}\|[len(IV_1)]_{64})$.

Additionally, the plaintext P, such as one data segment of plaintext data stream 610, may be encrypted using the encryption key K, such as encryption key 690 and with hash block $J_0$ formed above, such as segment initialization vector 1020. Additionally, the hash block $J_0$ (e.g., the segment initialization vector) may be incremented, such as to ensure that the same initialization vector is never used more than once with the same encryption key.

3. Let C=$GCTR_K(inc_{32}(J_0,P)$.

An authentication tag used as part of incremental authenticated encryption may be generated in any of various manners, according to different embodiment. For instance, in one example embodiment, an authentication tag, such as segment authentication tags 150, 670 and/or 1020 may be generated by first applying the GHASH function (e.g., that uses the hash key H) to a concatenation of any additional authenticated data (A), the encrypted data (e.g., the ciphertext, C) and the lengths of both the additional authenticated data and the encrypted data. Additionally, the concatenation may be padded (e.g., with zero bits) to ensure a uniform length, as shown in the example below:

4. Let u=128·[len(C)/128]−len(C) and let v=128·[len(A)/128−len(A)]
5. Define a block, S, as follows:
    S=$GHASH_H(A\|0^v\|C\|0^u\|[len(C)]_{64})$ In the example above, the output of the $GHASH_H$ function, S, may be considered the fingerprint of both the entire ciphertext (C) and any additionally authenticated data, A. Please note that a hash function used as part of incremental authenticated encryption, such as the GHASH function in the example above, may be a keyed hash function but may not be a cryptographic hash function. Thus, in some embodiments, the intermediate values used as part of the GCM-based encryption may be kept secret. For example, the hash subkey H in the above example may be kept secret and a public hash subkey may not be used.

In some embodiments, generation of segment authentication tags may be performed after each corresponding segment is encrypted. Thus, in the example below, as the plaintext of the data stream is encrypted, a segment authentication tag may be generated for every M kilobytes of plaintext that has been encrypted (e.g., for each data segment). In the example pseudo-code below, i may represent the number of data segments that have been encrypted so far and $C_i$ may represent the encrypted data of a particular data segment. Thus, During the computation for S, for every M kilobytes of plaintext that has been encrypted, Let
    i be the multiples of ($2^{10}$·M) bytes of plaintext that has been encrypted
    $C_i$ be the ($2^{10}$·M) bytes of C that has been generated so far When generating a segment authentication tag, according to this example embodiment, a hash block $S_i$ may be generated that is based on the encrypted data of the current data segment. The hash block $S_i$ may then be encrypted using the encryption key, such as encryption key 690, and using the hash block $J_1$, which may represent inverse segment initialization vector 1020, according to one embodiment.

$S_i=GHASH_H(A\|0^v\|C_i\|[len(A)]_{64}\|[len(C_i)]_{64})$
$\hat{T}_i=GCTR_K(inc_{32}(J_1,),Si))$.

For example, an incremental hash ($S_i$) may be generated using the same hash subkey (H) but using a different pre-counter block ($J_1$) based on an inverse initialization vector. $S_i$ may be encrypted into a segment authentication tag, $\hat{T}_i$, for the accumulated ciphertext at every M kilobytes of the respective plaintext (e.g., for every data segment). The segment authentication tag may then be appended to the ciphertext output right after the encrypted data, $C_i$, for the current segment. Note that in some embodiments, a segment's encrypted data may always be an even multiple of some size, such as a multiple of 16 bytes, and therefore there may be no need to pad (e.g., using '0' bits) the input to the GHASH function.

Thus, in some embodiments, a separate initialization vector space (e.g., based on the inverse of the main, or initial, initialization vector) may be utilized as part of incremental authenticated encryption. In some embodiments, the inverse initialization vector may be used to generate the segment authentication tags while the main initialization vector may be used to encrypt the data of the data segments themselves.

A segment authentication tag may be generated in different manners, using different techniques, according to different embodiments. For example, in one embodiment, a segment authentication tag may be based on an encryption of an incremented initialization vector (possibly combined with a counter). In another embodiment, a segment authentication tag may be based on a hashing (e.g., a HMAC) of some or all of the data (either plaintext or encrypted) in one or more of the data segments that have been processed (possibly including the current segment).

As described above, in some embodiments, a final authentication tag may be generated based on the encrypted data and using the main (e.g., not the inverse) initialization vector. For example, the hash block S, defined above may be encrypted using the hash block $J_1$, (which may represent, or be based on, a segment initialization vector). In one embodiment, a number of the most significant bits of the resulting encrypted data may be used as a final authentication tag, such as final authentication tag 670.

6. Let $T=MSB_t(GCTR_K(J_0,S))$.

In other embodiments, the final authentication tag may be generated using any of various techniques. For instance, in one embodiment the final authentication tag may be generated using the (possibly incremented) inverse initialization vector. In another embodiment, the final authentication tag may be generated based on a combination (e.g., a hash or HMAC) of some or all of the data in the data segments.

The output of the encryption algorithm may include a concatenation of the encrypted data, the segment authentication tags and the final authentication tags, as shown in the following example pseudo-code:

7. Let $$w = \left\lfloor \frac{len(c)}{M} \right\rfloor$$

if $w \cdot M = len(C)$, then let $n=MAX(0,w-1)$
if $w \cdot M \neq len(C)$, then let $n=MAX(0,w)$
$C_r = C - C_n$ 8. Let
$\hat{C} = C_1 \| \hat{T}_i \| C_2 - C_1 \| \hat{T}_i \| \ldots \| C_n - C_{n-1} \| \hat{T}_i \| C_r \| T$
where
$C = C_1 \| C_2 - C_1 \| C_3 - C_2 \| \ldots \| C_n - C_{n-1} \| C_r$ 9. Return $\hat{C}$ In some embodiments, if the last data block of the plaintext falls exactly at the interval that triggers the generation of an incremental authentication code (e.g., falls on a data segment boundary), the final authentication tag may not be generated. For instance, the last segment authentication tag may be sufficient to provide the necessary authentication. Alternatively, in another embodiment, if the last data block of the plaintext falls exactly at the interval that triggers the generation of an incremental authentication code (e.g., falls on a data segment boundary), no segment authentication tag may be generated for the final data segment and the final authentication tag may provide the authentication for the last data segment.

Note that the choice of 1 kilobyte as a minimum unit of incremental authentication (e.g., as the minimum data segment size) may provide an upper bound on additional overhead that may be incurred for the authentication tags that become part of the output of the incremental authenticated encryption algorithm, according to some embodiments. For example, in one embodiment, the total length of the authentication tags, e.g., $len(\hat{C}-T-C)$, may take up no more than $$1.5625\% \left( = \frac{16}{1024} \cdot 100\% \right)$$

of len(C).

Decrypting one or more data segments encrypted using an inverse initialization vector for generating segment authentication tags, as described above, may be implemented in any of various manners, according to various embodiments For example, decrypting the data of an encrypted data segment may be perform in a manner similar to that described above. For instance, a segment initialization vector may be determined based on the initial initialization vector and the position of the encrypted data segment within the sequence of the data segments (e.g., the amount of encrypted data that comes before the current segment in the encrypted data stream). The encrypted data of the current data segment may be decrypted using the segment initialization vector and the decryption key.

Figure 12:
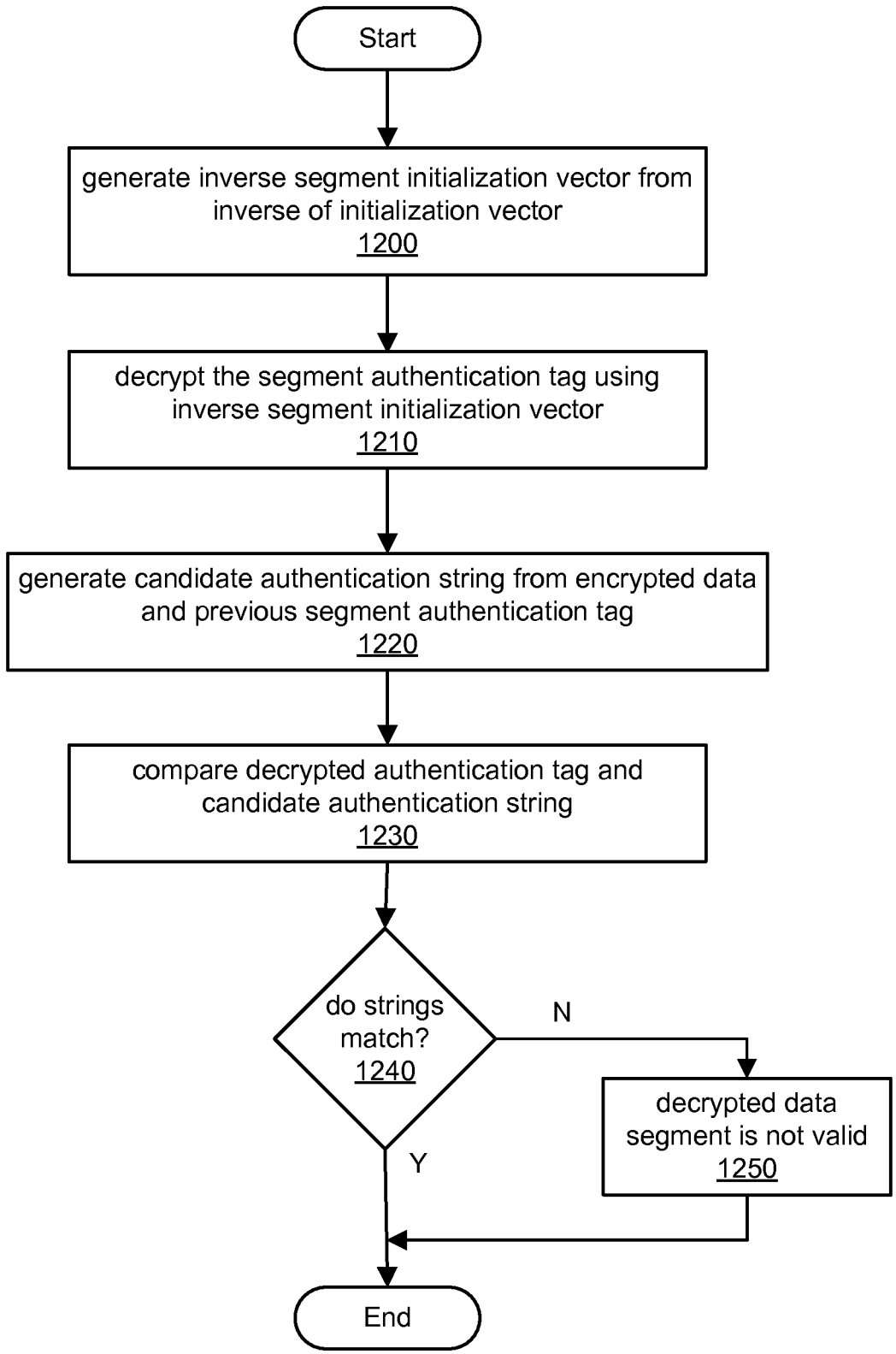
FIG. 12 is a flowchart illustrating one embodiment of a method for authentication according to incremental authenticated encryption, as described herein.

However, authenticating a data segment whose authentication tag was generated using an inverse initialization vector may involve using the authentication tag from the previous data segment, according to some embodiments. FIG. 12 is a flowchart illustrating one embodiment of a method for authentication according to incremental authenticated encryption, as described herein.

When authenticating an encrypted data segment whose authentication tag was generated based on an inverse initialization vector, a decryption component, such as decryption component 840, or an authorization component, such as authorization component 830, may be configured to first generate an inverse segment initialization vector from the inverse (or complement) of the initialization vector, as shown in block 1200. For example, as described above the inverse (or complement) of initialization vector 1000 may be used as the basis for generating inverse segment initialization vector 1020, according to some embodiments.

Additionally, decryption component 840 may be configured to decrypt the segment authentication tag using the inverse segment initialization vector, as shown in block 1210. As described above, regarding encrypting using an inverse initialization vector, a segment authentication tag may be generated by encrypting a hash block (based on the encrypted data) using the inverse segment initialization vector (e.g., based on the inverse initialization vector), according to some embodiments. Thus, during authentication, decryption component 840 may be configured to decrypt the segment authentication tag using the same in order to obtain the hash block that was originally encrypted (e.g., to generate the segment authentication tag).

As shown in block 1220, decryption component 840 may, in some embodiments, generate a candidate authentication string from the encrypted data of the current data segment and the previous segment authentication tag. For example, decryption component 840 may perform the same (or similar) techniques as used during encryption to generate the hash block that, during encryption, is used to generate the segment authentication tag. Since, during encryption, the inverse segment initialization vector is incremented with each segment authentication tag generated, during authentication, the segment authentication tag for the previous data segment may be used to authenticate the current segment authentication tag, according to some embodiments.

Thus, as described above regarding encryption, decryption component 840 and/or authentication component 830 may apply a hash function to a block based on the encrypted data (as well as any additional authenticated data). However, the hash function used may be configured to take, as input, a value allowing the resulting hash block to be the same as if the hash function had already been applied a certain number times. In other words, since decryption component 840 may be authenticating a data segment independently, and since during encryption the segment authentication tag may have been based on a hash block that incorporated the application of the hash function for previous data segments, an incremental hash function may be applied during authentication, as will be described in more detail below.

As shown in block 1230, decryption component 840 may be configured to compare the hash string resulting from decrypting the segment authentication tag with the generated candidate authentication string to determine whether they are the same or not. If, as indicated by the negative output of decision block 1240, the two strings do match, the decrypted data segment may not be valid (e.g., it was not authenticated), as shown in block 1250. Alternatively, if the strings to match, as indicated by the positive output of block 1240, decryption component 840 may determine that the decrypted data is authenticated and therefore valid.

Decrypting one or more data segments encrypted using an inverse initialization vector for generating segment authentication tags, as described above, may be implemented in any of various manners, according to various embodiments. For example, the following pseudo-code represents one possible embodiment of such decryption.

When decrypting a data segment independently from other data segments of the same data stream, the particular data segment may not be a complete data segment. For example, the last data segment of the data stream may be shorter than the other data segments. Thus, the encrypted data of an encrypted data segment may represent any of three possible cases:

(a) between two segment authentication tags, e.g., from a lower $\hat{T}_i$ to an upper $\hat{T}_j$; or (b) the first data segment of the data stream, e.g., from the beginning of the entire ciphertext ($\hat{C}$) up to a given $\hat{T}_j$; or (c) the last data segment of the data stream, e.g., from a specific $\hat{T}_i$ to the end of the entire ciphertext ($\hat{C}$)

One embodiment of a GCM-based decryption algorithm usable with incremental authenticated encryption, may be defined as GCM-AD$_K$(IV, M, α, L, $\hat{C}_\alpha$, A).

Such a decryption algorithm may, in some embodiment involve/require the following prerequisites:

approved block cipher CIPH with a 128-bit block size.
key K.
definitions of supported input-output lengths.
supported authentication tag length t associated with the key.
initialization vector IV.
M=size in kilobytes ($2^{10}$) used during authenticated encryption.
α=starting position, in unit of $2^{10}$ M bytes of the plaintext P which the first or 17th byte of $\hat{C}_\alpha$ corresponds to:

For example, if α=1, the first byte of $\hat{C}_\alpha$ corresponds to the first byte of P (and therefore the first byte of $\hat{C}$ also), but the length of $\hat{C}_\alpha$ can be less than or equal to that of $\hat{C}$ in such case.

If α=1, the first byte of $\hat{C}_\alpha$, which is $\hat{C}_2$, corresponds to $\hat{T}_1$ whereas the 17th byte of $\hat{C}_\alpha$ corresponds to the $2^{10}$ M+1st byte of P.

Similarly, if α=3, the first byte of $\hat{C}_3$, corresponds to $\hat{T}_2$ whereas the 17th byte of $\hat{C}_3$ corresponds to the 2~$2^{10}$ M+1st byte of P, etc.

L=number of M-kilobytes of the plaintext to be decrypted from the starting position, α; or −1 if the rest of the plaintext is to be decrypted. L must be set to −1 whenever the rest of the plaintext is to be decrypted.

$\hat{C}_\alpha$=ciphertext that begins with the authentication block ($\hat{T}_{\alpha-1}$) except when α=1, and ends with an authentication block ($\hat{T}_j$) or T. In particular, when α>1, the 17$^{th}$ byte of $\hat{C}_\alpha$ corresponds to the (1·M·$2^{10}$+1)st byte of the plaintext P. When α=1, the first byte of $\hat{C}_\alpha$ corresponds to the first byte of P. Note $\hat{C}_\alpha$=$\hat{C}$ if and only if α=1 and α=−1, where $\hat{C}$ is the entire output incremental authenticated encryption algorithm.

additional authenticated data A;

The output of such a decryption algorithm may be defined as:

P$_{(\alpha,L)}$ the portion of plaintext both authenticated and decrypted, or indication of inauthenticity FAIL.

α may represent the starting position (in unit of M-kilobytes) of the original plaintext P which the first byte of P$_{(\alpha,L)}$ corresponds to.

L may represent the length of the decrypted plaintext in unit of M-kilobytes; or −1 if the last byte of P$_{(\alpha,L)}$ corresponds to the last byte in P.

In particular, P$_{(\alpha,L)}$=P if and only if α=1 and L=−1, where P is the original plaintext in its entirety.

One example embodiment of a GCM-based decryption algorithm for use with incremental authenticated encryption may return a failure status if any of the following conditions is true:

bit lengths of IV, A or C are not supported
M<1 or not a multiple of $2^{10}$
α<1
L=0, or L<−1
if L>0,
if α=1 and $$\frac{len(\hat{C}_\alpha)}{8} \neq (2^{10}M + 16)L$$

if α≠1 and $$\frac{len(\hat{C}_\alpha)}{8} \neq (2^{10}M + 16)L + 16$$

One embodiment of a GCM-based incremental authenticated decryption algorithm may involve the following steps. For example, a hash key, H, may first be determined, which may be used by the GHASH function, discussed in more detail below.

2. Let H=CIPH$_K$($0^{128}$).

In some embodiments, an initialization vector may be used to generate a hash, or pre-counter, block to be used as part of the actual symmetric encryption/decryption, shown below. For example, if the length of the initialization vector is equal to some pre-defined length (e.g., 96 in the example bellow), then the hash block J$_0$ may be formed by concatenating the initialization vector with a counter. If however, the length of the initialization vector is less than some pre-defined length (e.g., 96 in the example bellow), then the hash block J$_0$ may be formed by concatenating one or more pad bits to the initialization vector and applying the GHASH function to the concatenation, as shown in the pseudo-code example below. In some embodiments, segment initialization vector 620 may represent the hash block J$_0$ shown in the pseudo-code example below.

3 Define a block, J$_0$, as follows:
if len(IV)=96, then let J$_0$=IV∥$0^{31}$∥1.
if len(IV)≠96, then let s=128⌈len(IV)/128⌉−len(IV), and let
J$_0$=GHASH$_H$(IV∥$0^{s+64}$∥[len(IV)]64), then increment J$_0$ by α·M·26 times (via inc$_{32}$).

In some embodiments, an inverse segment authentication vector may be generated based on the inverse of the initial initialization vector. Thus, as shown in the example pseudo-code below, the inverse of the initial initialization vector may be used to generate a block $J_1$, which may represent an inverse segment initialization vector.

Define a block, $IV_1$, as follows:
$IV_1 = xor(IV, 1^{len(IV)})$.

As shown in the example pseudo-code below, the inverse of the initial initialization vector $IV_1$ may be used to generate a hash, or pre-counter, block $J_1$, which may represent an inverse segment initialization vector, to be used as part of the actual symmetric encryption, shown below. For example, if the length of the inverse initialization vector is equal to some pre-defined length (e.g., 96 in the example bellow), then the hash block $J_1$ may be formed by concatenating the initialization vector with a counter. If however, the length of the inverse initialization vector is less than some pre-defined length (e.g., 96 in the example bellow), then the hash block $J_1$ may be formed by concatenating one or more pad bits to the initialization vector and applying the GHASH function to the concatenation, as shown in the pseudo-code example below.

However, the resulting has block may then be incremented a certain number of times, such as to simulate the same incrementing that may have occurred while encrypting the data stream up to this point.

Define a block, $J_1$, using the same algorithm as for $J_0$, except substituting IV with $IV_1$.
if $len(IV_1)=96$, then let $J_1=IV_1\|0^{31}\|1$.
if $len(IV_1) \neq 96$, then let $s=128\lceil len(IV_1)/128 \rceil - len(IV_1)$, and let
$J_1 = GHASH_H(IV_1\|0^{s+64}\|[len(IV_1)]64)$, then increment $J_1$ by $\alpha$ times (via $inc_{32}$).

As noted above, incremental authenticated encryption may logically divide the data stream into multiple data segments. Therefore, when decrypting, particular details of the current encrypted data segment may need to be determined, computed and/or generated. For example, the following pseudo-code uses information about the current segment (e.g., whether it is the first segment or not), as well as specific details regarding the example embodiment (e.g., the fact that an data segment may always be an even multiple 16 bytes), to locate the particular set of encrypted data (e.g., cipher text) associated with the current data segment.

4. Let:
l=M·$2^{10}$
if $\alpha=1$, let offset=0
if $\alpha \neq 1$, let offset=16
i=offset+1
if L=−1, $$max = \left\lfloor \frac{len(\hat{C}_\alpha)/8 - \text{offset} - t/8}{l+16} \right\rfloor$$

if $len(\hat{C}_\alpha)/8 - (max \cdot (l+16) + \text{offset} = t/'8$
max=max−1
$B_c = len(\hat{C}_\alpha) - max \cdot 128 - \text{offset} \cdot 8 - t$
else $$max = \left\lfloor \frac{len(\hat{C}_\alpha)/8 - \text{offset}}{l+16} \right\rfloor$$

$B_c = len(\hat{C}_\alpha) - max \cdot 128 - \text{offset} \cdot 8$
$u=128 \cdot \lceil B_c/128 \rceil - B_c$, and let $v=128 \cdot \lceil len(A/128 - len(A) \rceil$ In this example embodiment, a block $S_0'$ may be generated that represents a candidate authentication string to compare to the one derived from the segment authentication tag. If the current data segment occurs at the start of the stream of data (e.g., is the first data segment in sequence) the candidate authentication string may be able to be based on a previous authentication tag (e.g., since there isn't one prior to the first data segment). Otherwise, the candidate authentication string may be based on the previous segment authentication tag (e.g., $T_0$). Additionally, the segment initialization vector (e.g., $J_1$) may be incremented after being used to decrypt the previous authentication tag.

if $\alpha=1$,
$S_0' = GHASH_H(A\|0^v)$
else
$T_0 = \hat{C}_\alpha[1:16]$
$S_0' = GCTR_K(inc_{32}(J_1), T_0)$
Increment $J_1$ by 1

According to one example embodiment, if the entire data stream is being decrypted, each data segment may be authenticated by comparing a candidate authentication string (e.g., $S_n'$) to one obtained by decrypting the segment authentication tag. If the strings to not match, the authentication fails.

5. For n=1 to max
$\delta_n = \hat{C}_\alpha[i:1]$
$T_n = \hat{C}_\alpha[i+l:16]$
$S_n = GCST_K(inc_{32}(J_1), T_n)$
$S_n' = iGHASH(\delta n\|[len(A)]_{64}\|[len(l(\alpha+n)) \cdot 8]_{64}\|S_{n-1}')$
if $S_n' \neq S_n$, then return FAIL.
Increment $J_1$ by 1.

The encrypted data of the data segment may be decrypted using the segment initialization vector, which may be incremented appropriate (E.g., based on the size of the data segment) afterward. When decrypting a data segment other than the first data segment, the ciphertext increment ($\delta_i$) between two consecutive incremental tags (e.g., $\hat{T}_j$ and $\hat{T}_j$) may be decrypted and authenticated as if the entire data up to and including the current ciphertext ($\delta_i$) is present, according to some embodiments.

$Pn = GCTR_K(inc_{32}(J_0), \delta_n)$.
Increment $J_0$ by $2^6 M$.
i=i+l+16

When decrypting and authenticating the last data segment (e.g., L=−1 in this particular example embodiment), a decryption component may have to take into account whether or not there is a final authentication tag as well as a segment authentication tag, which may, in turn, depend on the length of the last data segment. In some embodiments, the final authentication tag is compared against a candidate authentication tag to determine the authenticity of all the data segments as a whole. Additionally, in some embodiments, the final authentication tag may be used to authenticate the last data segment in the data stream.

6. If L=−1
Let $l_r = (\hat{C}_\alpha)/8 - (max(l+16) + \text{offset})$
$C_r = \hat{C}_\alpha[i:l_r-t/8]$
$T = \hat{C}_\alpha[i+l_r-t/8:t/8]$
$S = iGHASH(C_r\|0^u\|[len(A)]_{64}\|[B_c + 8 \cdot l \cdot \alpha]_{64}, S_{max}')$
$P_r = GCTR_K(inc_{32}(J_0), C_r)$.
$T' = MSB_t(GCTR_K(J_0), S))$.
if $T \neq T'$, then return FAIL.

Additionally, the decryption algorithm may, in this particular example embodiment, output the decrypted plaintext by concatenating the plaintext for each of the decrypted data segments.
7. Let $P_{(\alpha, L)} = P_\alpha \| P_{\alpha\alpha 1} \| \ldots \| P_{max} \| P_r$
Return $P_{(\alpha, L)}$ In some embodiments, decryption component 840 may be configured to decrypt an entire encrypted data stream without authenticating each segment using its corresponding segment authentication tag. Instead, decryption component 840 may be configured to authenticate the multiple data segments as a whole (e.g., the entire data stream) using the final authentication tag.

Figure 13:
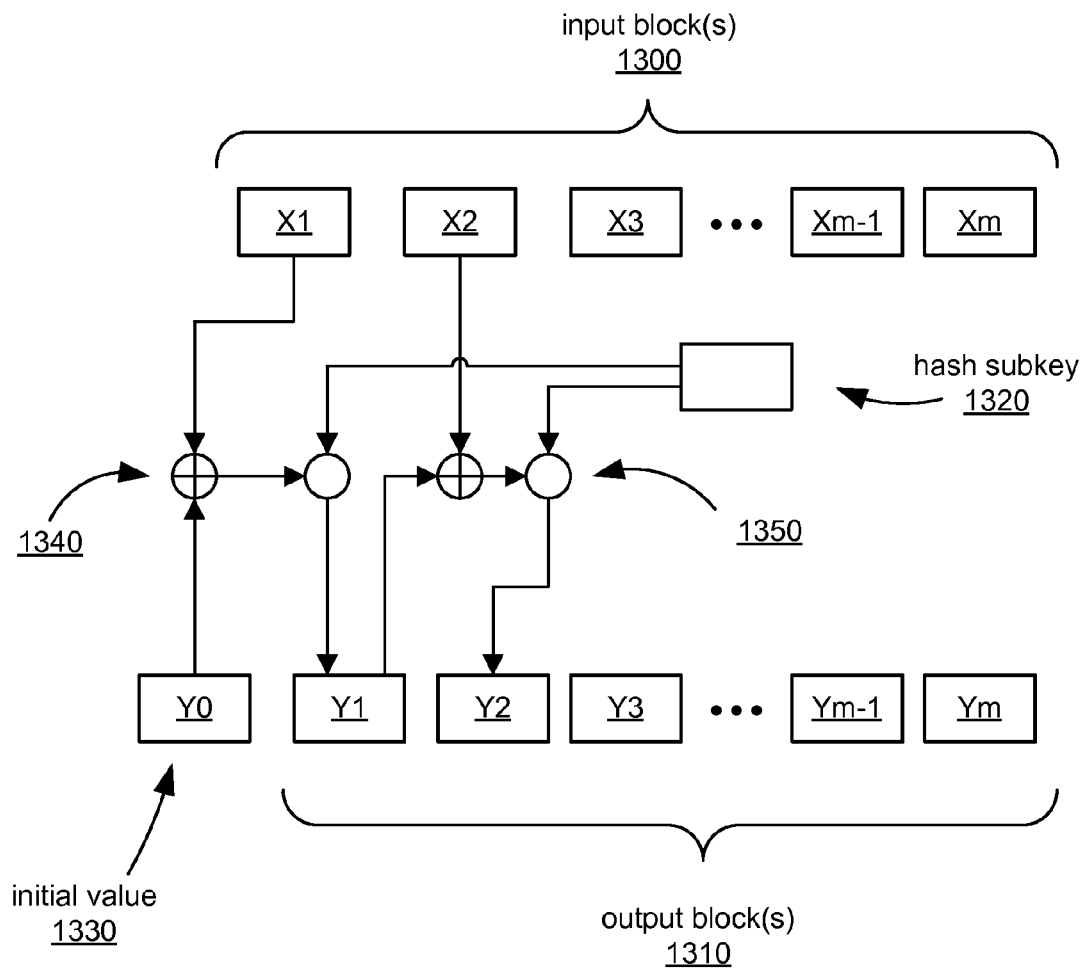
FIG. 13 is logical block diagram illustrating incremental hashing, as described herein.

Turning now to FIG. 13 is logical block diagram illustrating incremental hashing, as described herein. As noted above, some embodiments of incremental authenticated encryption may involve the use of an incremental keyed hashing algorithm. An incremental keyed hashing algorithm may receive as input a specified initial value used when determining the output. For example, the input block 1300 may represent one or more blocks of 128 bits, while the output block 1310 may represent the same number of output blocks of 128 bits.

When implementing a GHASH algorithm, each input block may be combined, such as by using the XOR function in some embodiment, with the previous output block and also with the hash subkey 1320, according to some embodiments. The initial value 1330 may be used to combine with the first input block X1. Thus, as illustrated in FIG. 13, input block X1 may be combined with the initial value in Y0, then combined with the hash subkey 1320 before being output as block Y1. Similarly, input block X2 may be combined with output block Y1, and then with the hash subkey and then output as output block Y2. This process may continue until all the input blocks have been processed and the results output.

Figure 14:
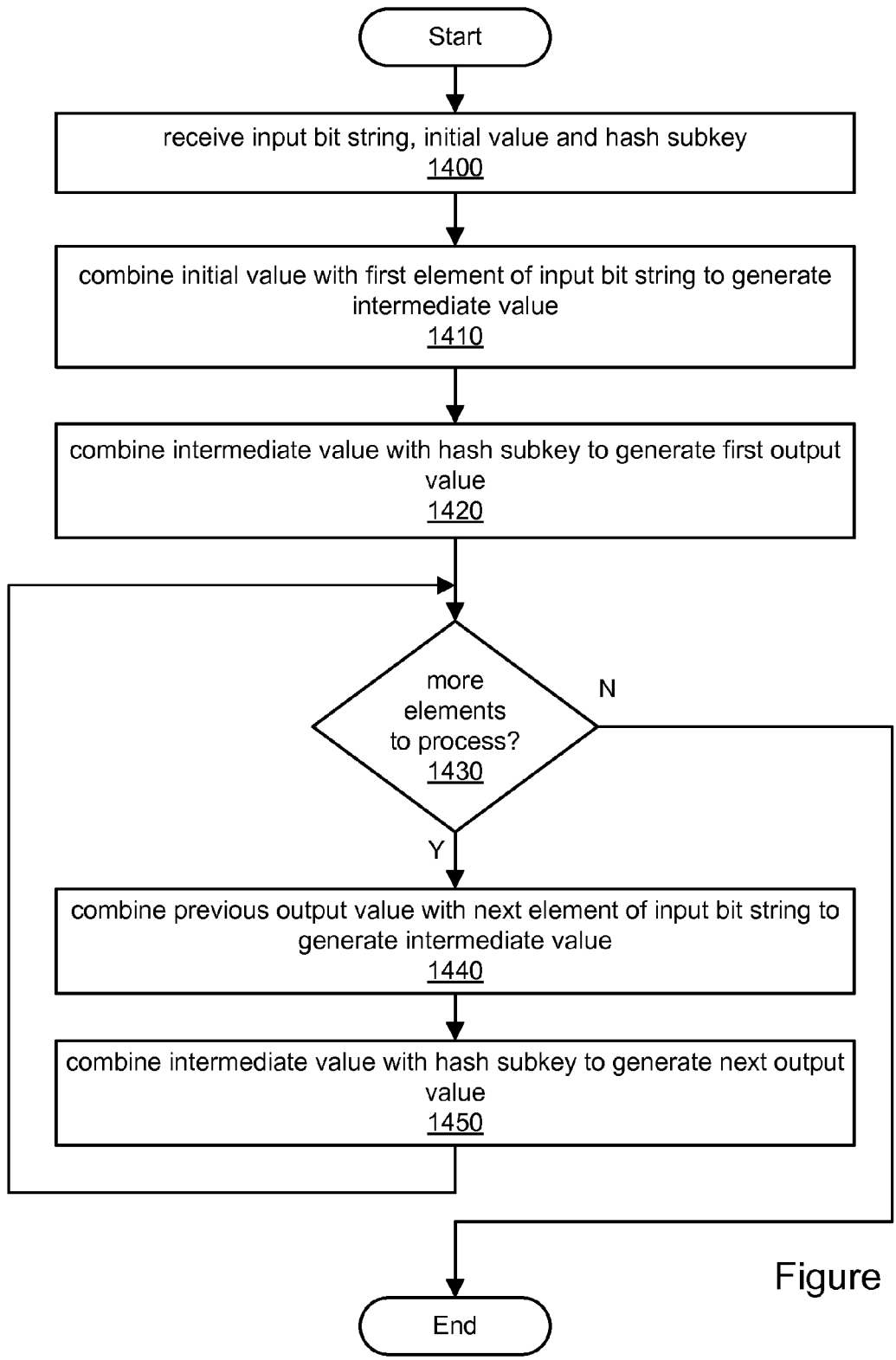
FIG. 14 is a flowchart illustrating one embodiment of a method for incremental hashing, as described herein.

FIG. 14 is a flowchart illustrating one embodiment of a method for incremental hashing, as described herein. As shown in block 1400, according to one embodiment, an incremental hashing method utilized by incremental authenticated encryption may include receiving the input bit string, the initial value and the hash subkey. Initially, when processing the input blocks, the initial value may be combined with the first element in the input block to generate an intermediate value, as shown in block 1410. For example, in one embodiment, the first input element may be XORed with the initial value to generate the intermediate value, although other logical operators and/or more complicated operations may also be used according to different embodiments.

The intermediate value may then be combined with the hash subkey to generate the first output value, as shown in block 1420. The exact manner in which the hash subkey may be combined with the intermediate value may vary from embodiment to embodiment and, in general, virtually any logical operation may be utilized, according to different embodiments.

If there are additional elements to process, as indicated by the positive output of decision block 1430, the previous output value may be combined with the next input element to generate an intermediate value, as shown in block 1440. The intermediate value may be combined with the hash subkey to generate the next output value, as shown in block 1450. This process may continue until all the input values have been processed, as indicated by the loop shown in FIG. 14 and the negative output of block 1430.

One particular example embodiment of an incremental hashing function is given using the pseudo-code below. For instance, one embodiment of an incremental hashing function may be defined as, $iGHASH_H(X, Y)$, wherein H may represent a hash subkey, such as hash subkey 1320, X may represent the input block(s) 1300, and Y may represent the output block(s) 1310.

Thus, in some embodiments, an incremental hashing function utilized by incremental authenticated encryption may support/require the following prerequisites:
block H, the hash subkey.

Additionally, in some embodiments, the incremental hashing function may involve/require the following as input:
bit string X such that $len(X) = 128\,m$ for some positive integer m.
the initial block Y of 128-bits The output generated by the hashing function may, in some embodiments be defined as:
block $iGHASH_H(X, Y)$ In some embodiments, a hashing function may take the input bit string and generate a new output bit string by manipulating the input bits in any of various ways. For example, as shown by the pseudo-code below, a hashing function may generate an output bit string in which each bit of output is generated by XORing one bit of the input bit string with the immediately previous output bit and then applying the hash subkey. When processing the first input element, the incremental hashing function may use the initial block that was input. For instance, the following pseudo-code represents one example embodiment of a hashing function:
1. Let $X_1, X_2, \ldots, X_{m-1}, X_m$ denote the unique sequence of blocks such that $X = X_1 \| X_2 \| \ldots \| X_{m-1} \| X_m$
2. Let $Y_0 = Y$ be the initial block
3. For i=1, m, let $Y_i = (Y_{i-1} \oplus X_i) \cdot H$.
4. Return $Y_m$.

Illustrative Computer System

Figure 15:
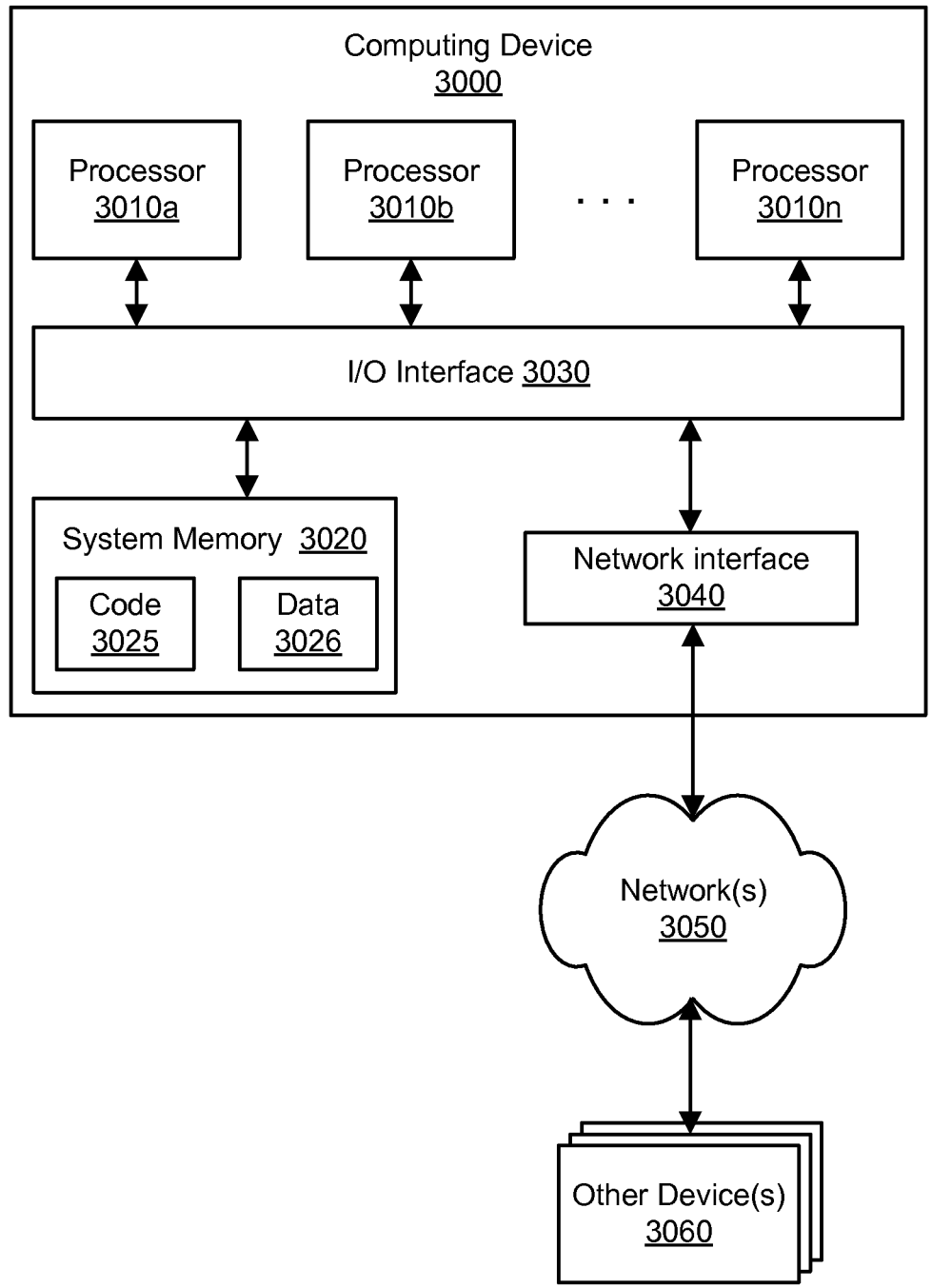
FIG. 15 is a block diagram illustrating one embodiment of a computer system capable of implemented incremental authenticated encryption, as described herein.

In at least some embodiments, a computer system that implements a portion or all of one or more of the technologies described herein may include a general-purpose computer system that includes or is configured to access one or more computer-readable media. FIG. 15 illustrates such a general-purpose computing device 3000. In the illustrated embodiment, computing device 3000 includes one or more processors 3010a-3010n coupled to a system memory 3020 via an input/output (I/O) interface 3030. Computing device 3000 further includes a network interface 3040 coupled to I/O interface 3030.

A computing device 3000 (such as may implement incremental authenticated encryption, encryption component 640 and/or decryption component 840) may be any of various types of devices, including, but not limited to, a programmable logic controller, programmable logic array, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

A computing device 3000 may include a processor unit 3010 (possibly including multiple processors, a single-threaded processor, a multi-threaded processor, a multi-core processor, etc.) which may be configured to execute one or more modules or applications configured to implement incremental authenticated encryption, encryption component 640 and/or decryption component 840, which may be present within program instructions stored in system memory 3020 of the same computing device 3000 or may be present within program instructions stored within a memory of another computer system similar to or different from computing device 3000.

In various embodiments, computing device 3000 may be a uniprocessor system including one processor or a multiprocessor system including several processors 3010a and 3010b through 3010n (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example code 3025 may represent program instruction configured to implement incremental authenticated encryption, encryption component 640 and/or decryption component 840, in one embodiment.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a computing device, comprising a data input component, a data output component, and an incremental authenticated encryption component implemented via one or more hardware processors of the computing device;
   wherein the data input component is configured to receive a stream of data;
   wherein the incremental authenticated encryption component is configured to:
      determine a pre-initialization vector;
      determine an encryption key; and
      for each respective data segment of a plurality of data segments of the stream of data:

determine a segment initialization vector for the respective data segment based, at least in part, on the pre-initialization vector, wherein the segment initialization vector is unique among segment initialization vectors for the plurality of data segments;

encrypt the respective data segment using the segment initialization vector and the encryption key;

determine a segment authentication tag based, at least in part, on the encrypted data segment and the segment initialization vector; and determine a final authentication tag for the plurality of data segments;

wherein the data output component is configured to:
output the plurality of encrypted data segments with their respective segment authentication tags; and
output the final authentication tag.

2. The system of claim 1, further comprising an incremental authenticated decryption component;

wherein the data input component is further configured to:
receive an encrypted data segment and a corresponding segment authentication tag;

wherein the incremental authenticated decryption component is configured to:
determine a decryption key;
determine a pre-initialization vector for the encrypted data segment;
determine a segment initialization vector for the encrypted data segment based, at least in part, on the pre-initialization vector for the encrypted data segment;
decrypt the encrypted data segment using the segment initialization vector and the decryption key; and
authenticate the decrypted data segment based on the corresponding segment authentication tag.

3. The system of claim 1, wherein the segment authentication tag is based on an inverse of the segment initialization vector.

4. The system of claim 1,
wherein the data output component is further configured to output one or more of the encrypted data segments before all of the plurality of data segments are encrypted;
wherein the incremental authenticated encryption component is further configured to store, at least temporarily, summary information regarding the segment authentication tags; and
wherein the final authentication tag is based on the summary information regarding the segment authentication tags.

5. The system of claim 1, wherein to determine the segment initialization vector for a data segment, the incremental authenticated encryption component is further configured to:
combine the pre-initialization vector with a sequence value indicating the sequence of the respective data segment within the plurality of data segments.

6. A method for authenticated encryption, comprising:
performing, by one or more computers:
receiving a data stream, an initial initialization vector, and an encryption key; and
encrypting the data stream, comprising:
encrypting each of a plurality of data segments of the data stream according to respective segment initialization vectors, wherein each respective segment initialization vector is based, at least in part, on the initial initialization vector, and wherein each respective segment initialization vector is unique among all segment initialization vectors for the plurality of data segments;

determining, for each respective data segment, a segment authentication tag based, at least in part, on the encrypted data and the segment initialization vector; and determining a final authentication tag for the plurality of data segments, wherein the final authentication tag is usable for authenticating the plurality of data segments as a whole.

7. The method of claim 6, wherein the segment authentication tag is based on an inverse of the segment initialization vector.

8. The method of claim 7, wherein said determining the segment authentication tag comprises:
generating an intermediate hash block, wherein said generating comprises applying a keyed hash function to a value indicating a number of the plurality of data segments of the data stream already encrypted as part of said encrypting the data stream.

9. The method of claim 8, wherein said determining the segment authentication tag further comprises:
encrypting the intermediate hash block using the inverse of the segment initialization vector.

10. The method of claim 6, wherein the final authentication tag is based on summary information regarding the individual, respective segment authentication tags.

11. The method of claim 6, wherein said determining the segment initialization vector comprises: combining the initial initialization vector with a sequence value indicating the position of the respective data segment within the plurality of data segments.

12. The method of claim 6, wherein the initial initialization vector comprises one or more bits of randomly generated data.

13. The method of claim 12, further comprising incrementing the initial initialization vector when determining each respective segment initialization vector.

14. The method of claim 6, further comprising:
storing the encrypted data stream in a data store, wherein the stored encrypted data stream includes the plurality of segment authentication tags; and
storing the plurality of segment authentication tags in metadata for the stored encrypted data stream, separately from the stored encrypted data stream.

15. The method of claim 6, further comprising:
receiving an encrypted data segment and a corresponding segment authorization tag;
decrypting the encrypted data segment; and
authenticating the decrypted data segment based on the segment authentication tag.

16. A non-transitory, computer-accessible storage medium comprising program instructions that when executed on one or more hardware processors implement:
receiving a decryption key;
receiving a portion of an encrypted data stream, wherein the portion comprises an encrypted data segment of a plurality of encrypted data segments of the encrypted data stream and a corresponding segment authentication tag;
determining a pre-initialization vector for the encrypted data segment;
determining a segment initialization vector for the encrypted data segment based, at least in part, on the pre-initialization vector for the encrypted data segment;

authenticating the decrypted data segment based on the corresponding segment authentication tag; and decrypting the encrypted data segment using the segment initialization vector and the decryption key;

wherein said authentication may be performed before or after said decrypting.

17. The non-transitory, computer-accessible storage medium of claim 16, wherein said authenticating comprises:

determining a candidate authentication tag based on segment initialization vector;

comparing the candidate authentication tag to the received segment authentication tag; and determining that the data segment is authenticated if the candidate authentication tag matches the segment authentication tag.

18. The non-transitory, computer-accessible storage medium of claim 16, wherein the received portion further comprises a segment authentication tag for another of the plurality of data segments, wherein the other data segment is immediately prior to the encrypted data segment of the received portion in the encrypted data stream;

wherein the segment authentication tag is based, at least in part, on an inverse of the segment initialization vector and a hash of a plurality of encrypted data segments of the encrypted data stream including the encrypted data segment of the received portion;

wherein said authenticating comprises:

decrypting the segment authentication tag using the inverse of the segment authentication vector to generate a received authentication block;

applying a keyed hash function to the encrypted data segment using the previous segment authentication tag to generate a candidate authentication block;

comparing the candidate authentication block to the received authentication block; and determining that the encrypted data segment is authenticated if the candidate authentication block matches the received authentication block.

19. The non-transitory, computer-accessible storage medium of claim 16, wherein the program instructions are further executable on the one or more computers to implement:

receiving the plurality of encrypted data segments of the encrypted data stream and a respective plurality of segment authentication tags, wherein each segment authentication tag corresponds to one of the plurality of encrypted data segments;

receiving a final authorization tag for the plurality of encrypted data segments; and authenticating the plurality of encrypted data segments based on the final authorization tag for the plurality of encrypted data segments.

20. The non-transitory, computer-accessible storage medium of claim 19, wherein said authenticating the plurality of encrypted data segments comprises:

generating a candidate authorization tag based on the plurality of segment authentication tags;

comparing the candidate authorization tag with the received final authorization tag; and determining that the plurality of encrypted data segments are authenticated if the candidate authorization tag matches the received final authorization tag.

21. A method, comprising:

performing by one or more computers comprising one or more respective hardware processors:

receiving a plurality of encrypted data segments of an encrypted data stream and a respective plurality of segment authentication tags, wherein each segment authentication tag corresponds to one of the plurality of encrypted data segments;

receiving a final authorization tag for the plurality of encrypted data segments; and authenticating the plurality of encrypted data segments based on the final authorization tag for the plurality of encrypted data segments, without individually authenticating any of the plurality of encrypted data segments using its corresponding segment authentication tag.

\* \* \* \* \*